United States Patent
Bucher et al.

(10) Patent No.: US 10,046,659 B2
(45) Date of Patent: Aug. 14, 2018

(54) SYSTEMS, APPARATUS AND METHOD FOR ADAPTIVE WIRELESS POWER TRANSFER

(71) Applicant: QUALCOMM Incorporated, San Diego, CA (US)

(72) Inventors: Roman Bucher, Wabern (CH); Marcel Fischer, Boniswil (CH); Hans Peter Widmer, Wohlenschwil (CH)

(73) Assignee: QUALCOMM Incorporated, San Diego, CA (US)

( * ) Notice: Subject to any disclaimer, the term of this patent is extended or adjusted under 35 U.S.C. 154(b) by 305 days.

(21) Appl. No.: 14/863,231

(22) Filed: Sep. 23, 2015

(65) Prior Publication Data

US 2016/0176300 A1    Jun. 23, 2016

Related U.S. Application Data

(60) Provisional application No. 62/094,839, filed on Dec. 19, 2014.

(51) Int. Cl.
*H02J 5/00* (2016.01)
*B60L 11/18* (2006.01)
(Continued)

(52) U.S. Cl.
CPC ............. *B60L 11/182* (2013.01); *H02J 5/005* (2013.01); *H02J 7/025* (2013.01); *H02J 7/04* (2013.01); *H02J 50/12* (2016.02); *H02M 3/3376* (2013.01); *H02M 3/33523* (2013.01); *B60L 2210/30* (2013.01); *H02J 50/80* (2016.02); *H02M 2001/0048* (2013.01);
(Continued)

(58) Field of Classification Search
CPC . H02M 3/337; H02M 3/33592; B60L 11/182; B60L 11/185; B60L 11/1877
See application file for complete search history.

(56) References Cited

U.S. PATENT DOCUMENTS

| 8,884,581 B2 | 11/2014 | Widmer et al. |
| 2011/0254377 A1 | 10/2011 | Wildmer et al. |

(Continued)

FOREIGN PATENT DOCUMENTS

| WO | WO-2011127449 A2 | 10/2011 |

OTHER PUBLICATIONS

International Search Report and Written Opinion—PCT/US2015/059052—ISA/EPO—Feb. 15, 2016.

*Primary Examiner* — Jeffrey Shin
(74) *Attorney, Agent, or Firm* — Knobbe, Martens, Olson & Bear, LLP

(57) ABSTRACT

An apparatus for wirelessly receiving power from a wireless power transmitter is provided. The apparatus comprises an active switching rectifier operably connected to a coupler and configured to operate in a first bridge mode and a second bridge mode. The apparatus comprises a controller configured to adjust an input resistance of the rectifier to a first value that provides a first wireless power transfer efficiency when the rectifier operates in the first bridge mode. The controller is configured to adjust the input resistance of the rectifier to a second value that provides a second wireless power transfer efficiency less than the first wireless power transfer efficiency while operating within one or more operating limitations when the rectifier operates in the second bridge mode.

30 Claims, 12 Drawing Sheets

(51) Int. Cl.
*H02J 7/02* (2016.01)
*H02J 7/04* (2006.01)
*H02J 50/12* (2016.01)
*H02M 3/335* (2006.01)
*H02M 3/337* (2006.01)
*H02J 50/80* (2016.01)
*H02M 1/00* (2006.01)

(52) U.S. Cl.
CPC .. *H02M 2001/0058* (2013.01); *Y02T 10/7005* (2013.01); *Y02T 10/7072* (2013.01); *Y02T 10/7241* (2013.01); *Y02T 10/92* (2013.01); *Y02T 90/122* (2013.01); *Y02T 90/127* (2013.01); *Y02T 90/14* (2013.01)

(56) References Cited

U.S. PATENT DOCUMENTS

| | | |
|---|---|---|
| 2013/0033118 A1 | 2/2013 | Karalis et al. |
| 2014/0009109 A1 | 1/2014 | Lee et al. |
| 2014/0159646 A1* | 6/2014 | Sankar .................. H02J 17/00 320/107 |
| 2014/0268897 A1* | 9/2014 | Zimmanck .......... H02M 3/3353 363/17 |
| 2014/0347007 A1 | 11/2014 | Kee et al. |

* cited by examiner

SYSTEMS, APPARATUS AND METHOD FOR ADAPTIVE WIRELESS POWER TRANSFER

CROSS REFERENCE TO RELATED APPLICATIONS

This application claims priority to Provisional Application No. 62/094,839 entitled "SYSTEMS, APPARATUS AND METHOD FOR ADAPTIVE WIRELESS POWER TRANSFER" filed Dec. 19, 2014. The disclosure of Provisional Application No. 62/094,839 is hereby expressly incorporated in its entirety by reference herein.

FIELD

The present application relates generally to wireless power transfer, and more specifically to systems, apparatus and methods for adaptive wireless power transfer.

BACKGROUND

Remote systems such as vehicles have been introduced that include locomotion power from electricity and batteries to provide that electricity. Hybrid electric vehicles include on-board chargers that use power from vehicle braking and traditional motors to charge the vehicles. Vehicles that are solely electric must receive the electricity for charging the batteries from other sources. These electric vehicles are conventionally proposed to be charged through some type of wired alternating current (AC) such as household or commercial AC supply sources.

Efficiency is of importance in a wireless power transfer system due to the losses occurring in the course of wireless transmission of power. Since wireless power transmission is often less efficient than wired transfer, efficiency is of an even greater concern in a wireless power transfer environment. As a result, systems, apparatus and methods for adaptive wireless power transfer are desirable.

SUMMARY

In some implementations, an apparatus for wirelessly receiving power from a wireless power transmitter is provided. The apparatus comprises an active switching rectifier operably connected to a coupler and configured to operate in a first bridge mode and a second bridge mode. The apparatus further comprises a controller configured to adjust an input resistance of the rectifier to a first value that provides a first wireless power transfer efficiency when the rectifier operates in the first bridge mode. The controller is further configured to adjust the input resistance of the rectifier to a second value that provides a second wireless power transfer efficiency less than the first wireless power transfer efficiency while operating within one or more operating limitations when the rectifier operates in the second bridge mode.

In some other implementations, a method for wirelessly receiving power from a wireless power transmitter is provided. The method comprises adjusting an input resistance of an active switching rectifier operably connected to a coupler to a first value that provides a first wireless power transfer efficiency when the rectifier operates in a first bridge mode, the rectifier configured to operate in the first bridge mode and a second bridge mode. The method comprises adjusting the input resistance of the rectifier to a second value that provides a second wireless power transfer efficiency less than the first wireless power transfer efficiency while operating within one or more operating limitations when the rectifier operates in the second bridge mode. The method comprises receiving the wireless power from the wireless power transmitter.

In yet other implementations a non-transitory computer-readable medium is provided. The medium comprises code that, when executed, causes an apparatus configured to wirelessly receiving power from a wireless power transmitter to adjust an input resistance of an active switching rectifier operably connected to a coupler to a first value that provides a first wireless power transfer efficiency when the rectifier operates in a first bridge mode, the rectifier configured to operate in the first bridge mode and a second bridge mode. The code, when executed, causes an apparatus to adjust the input resistance of the rectifier to a second value that provides a second wireless power transfer efficiency less than the first wireless power transfer efficiency while operating within one or more operating limitations when the rectifier operates in the second bridge mode. The code, when executed, causes an apparatus to receive the wireless power from the wireless power transmitter.

In yet other implementations an apparatus for wirelessly receiving power from a wireless power transmitter is provided. The apparatus comprises means for rectifying an input from a coupler configured to operate in a first bridge mode and a second bridge mode. The apparatus comprises means for adjusting an input resistance of the means for rectifying to a first value that provides a first wireless power transfer efficiency when the means for rectifying operates in the first bridge mode. The apparatus comprises means for adjusting an input resistance of the means for rectifying to a second value that provides a second wireless power transfer efficiency less than the first wireless power transfer efficiency while operating within one or more operating limitations when the rectifier operates in the second bridge mode.

In yet other implementations, an apparatus for wirelessly transmitting power to a wireless power receiver is provided. The apparatus comprises an inverter operably connected to a coupler and configured to operate in a first bridge mode and a second bridge mode. The apparatus comprises a controller configured to adjust an input resistance of the rectifier to a first value that provides a first wireless power transfer efficiency when the inverter operates in the first bridge mode. The controller is configured to adjust the input resistance of the rectifier to a second value that provides a second wireless power transfer efficiency less than the first wireless power transfer efficiency while operating within one or more operating limitations when the inverter operates in the second bridge mode.

In yet other implementations, a method for wirelessly transmitting power to a wireless power receiver is provided. The method comprises adjusting an input resistance of a rectifier operably connected to a coupler to a first value that provides a first wireless power transfer efficiency when the inverter operates in the first bridge mode, the inverter configured to operate in the first bridge mode and a second bridge mode. The method comprises adjusting the input resistance of the rectifier to a second value that provides a second wireless power transfer efficiency less than the first wireless power transfer efficiency while operating within one or more operating limitations when the inverter operates in the second bridge mode. The method comprises wirelessly transmit the power to the wireless power receiver.

In yet other implementations, a non-transitory computer-readable medium is provided. The medium comprises code that, when executed, causes a wireless power transmitter to adjust an input resistance of a rectifier operably connected to a coupler to a first value that provides a first wireless power transfer efficiency when the inverter operates in the first bridge mode, the inverter configured to operate in the first bridge mode and a second bridge mode. The code, when executed, further causes the wireless power transmitter to adjust the input resistance of the rectifier to a second value that provides a second wireless power transfer efficiency less than the first wireless power transfer efficiency while operating within one or more operating limitations when the inverter operates in the second bridge mode. The code, when executed, further causes the wireless power transmitter to wirelessly transmit the power to the wireless power receiver.

DETAILED DESCRIPTION

The detailed description set forth below in connection with the appended drawings is intended as a description of some implementations and is not intended to represent the only implementations in which the present application can be practiced. The detailed description includes specific details for the purpose of providing a thorough understanding of the some implementations. It will be apparent to those skilled in the art that the some implementations may be practiced without these specific details. In some instances, well-known structures and devices are shown in block diagram form in order to avoid obscuring the novelty of the some implementations presented herein.

The term "wireless power" is used herein to mean any form of energy associated with electric fields, magnetic fields, electromagnetic fields, or otherwise that is transmitted from a transmitter to a receiver without the use of physical electromagnetic conductors.

Moreover, the term "wireless charging" is used herein to mean providing wireless power to one or more electrochemical cells or systems including electrochemical cells for the purpose of recharging the electrochemical cells.

The term "battery electric vehicle" (vehicle) is used herein to mean a remote system, and example of which is a vehicle that includes, as part of its locomotion abilities, electrical power derived from one or more rechargeable electrochemical cells. As non-limiting examples, some vehicles may be hybrid electric vehicles that include onboard chargers that use power from vehicle deceleration and traditional motors to charge the vehicles, other vehicles may draw all locomotion ability from electrical power. Other "remote systems" are contemplated including electronic devices and the like. Various terms and acronyms are used herein including, but not limited to, the following:

AC Alternating Current
Vehicle Battery Electric Vehicle
CB Charging Base
DC Direct Current
EV Electric Vehicle
FB Full Bridge
FDX Full Duplex
FET Field Effect Transistor
G2V Grid-to-Vehicle
HB Half Bridge
HDX Half Duplex
IGBT Insulated Gate Bipolar Transistor
IPT Inductive Power Transfer
ISM Industrial Scientific and Medical
LF Low Frequency
PWM Pulse Width Modulation
r.m.s. Root Mean Square
VLF Very Low Frequency
V2G Vehicle-to-Grid
ZSC Zero Current Switching By way of example and not limitation, a remote system is described herein in the form of an electric vehicle (vehicle). Other examples of remote systems are also contemplated including various electronic devices and the like capable of receiving and transferring wireless power.

Figure 1:
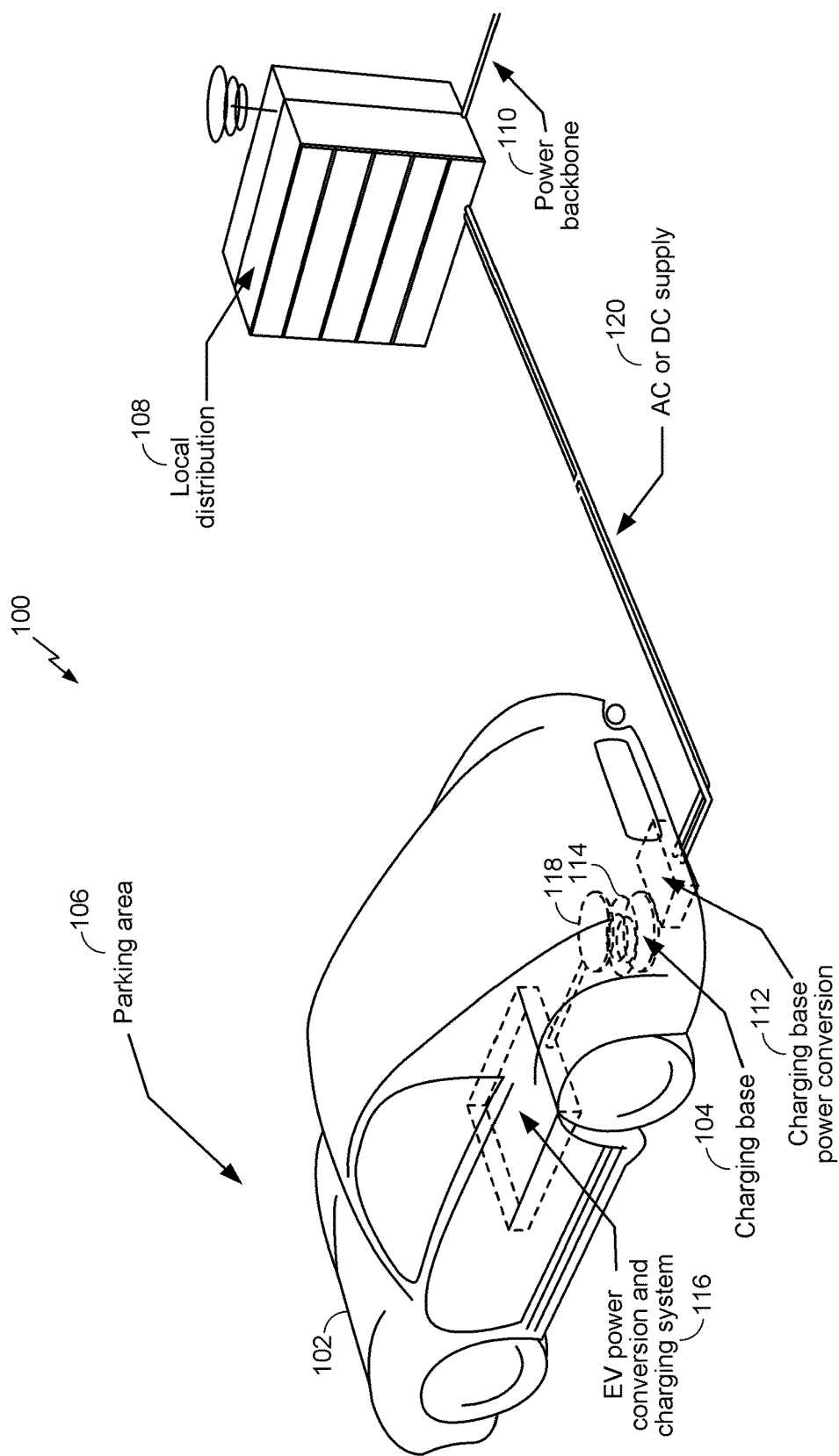
FIG. 1 illustrates a wireless power transfer system for wireless charging enabled remote systems such as a vehicle while the vehicle is parked near a wireless charging base (CB), in accordance with some implementations.

FIG. 1 illustrates a wireless power transfer system 100 for wireless charging enabled remote systems such as a vehicle 102 while the vehicle 102 is parked near a wireless charging base (CB) 104, in accordance with some implementations. The vehicle 102 is illustrated in a parking area 106 and parked over the CB 104. A local distribution center 108 is connected to a power backbone 110 and is configured to provide an Alternating Current (AC) or a Direct Current (DC) supply 120 to charging base power conversion system 112 as part of the CB 104. The CB 104 also includes a primary coupler 114 for generating a magnetic near-field or picking-up energy from a magnetic near-field by a secondary coupler. The vehicle 102 includes a battery (not individually shown in FIG. 1), a secondary power conversion and power transfer system 116, and a secondary coupler 118 configured to interact with the primary coupler 114.

In some implementations the secondary coupler 118 may be aligned with the primary coupler 114 and, therefore, disposed within the near-field region of the primary coupler 114 simply by the driver positioning the vehicle 102 correctly relative to the primary coupler 114. In other some implementations, the driver may be given visual feedback, auditory feedback, tactile feedback or combinations thereof to determine when the vehicle is properly placed for wireless power transfer. In yet other some implementations, the vehicle 102 may be positioned by an autopilot system, which may move the vehicle 102 back and forth (e.g., in zig-zag movements) until an alignment error has reached a tolerable value. This may be performed automatically and autonomously by the vehicle 102 without or with only minimal driver intervention provided that the vehicle 102 is equipped with a servo steering wheel, ultrasonic sensors all around and artificial intelligence.

The CB 104 may be located in a variety of locations. As non-limiting examples, some suitable locations are a parking area at a home of the vehicle owner, parking areas reserved for vehicle wireless charging modeled after conventional petroleum-based filling stations, and parking lots at other locations such as shopping centers or places of employment.

As a further explanation of a vehicle-to-grid (V2G) capability, the wireless power transmit and receive capabilities can be configured as reciprocal such that the CB 104 transfers power to the vehicle 102 and the vehicle 102 transfers power to the CB 104. This capability may be useful for power distribution stability by allowing the vehicle 102 to contribute power to the overall distribution system in a similar fashion to how solar-cell power systems may be connected to the power grid and supply excess power to the power grid.

Figure 2:
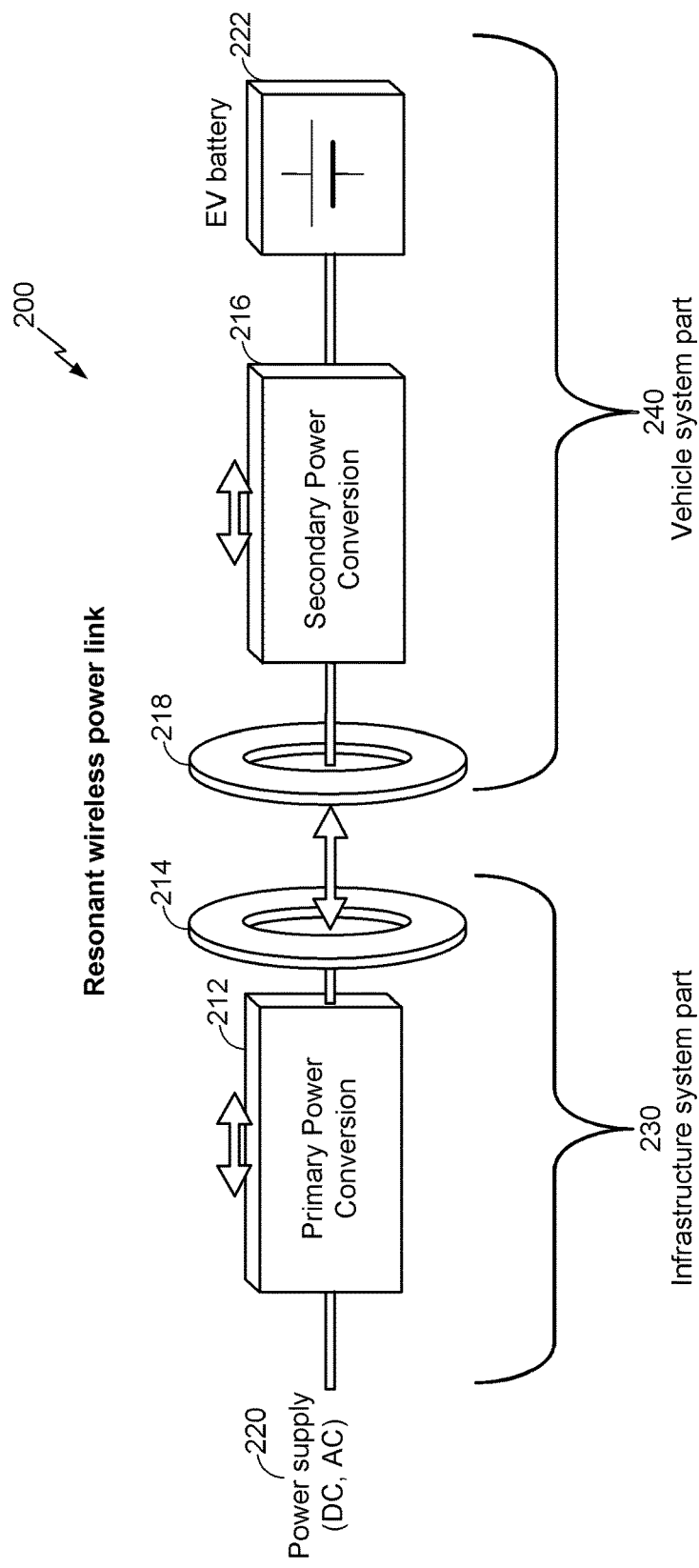
FIG. 2 is a simplified block diagram of a wireless power transfer system for a vehicle, in accordance with some implementations.

FIG. 2 is a simplified block diagram of a wireless power transfer system 200 for a vehicle, in accordance with some implementations. In FIG. 2, a conventional power supply 220, which may be AC or DC, supplies power to the primary power conversion module 212, assuming energy transfer towards the vehicle. The primary power conversion module 212 drives the primary coupler 214 to emit a desired frequency signal. If the primary coupler 214 and the secondary coupler 218 are tuned to substantially the same frequencies and the secondary coupler 218 is within the near-field of the primary coupler 214, the secondary coupler 218 may couple with the primary coupler 214 such that power may be transferred to the secondary coupler 218 and extracted in the secondary power conversion module 216. The secondary power conversion module 216 may then charge the vehicle battery 222. The power supply 220, the primary power conversion module 212, and the primary coupler 214 make up the infrastructure part 230 of an overall wireless power transfer system 200, which may be stationary and located at a variety of locations as discussed above. The vehicle battery 222, the secondary power conversion module 216, and the secondary coupler 218 make up a wireless power subsystem 240 that is part of the vehicle or part of the battery pack.

In operation, assuming energy transfer towards the vehicle or battery, input power is provided from the power supply 220 such that the primary coupler 214 generates a radiated field for providing energy transfer. The secondary coupler 218 couples to the radiated field and generates output power for storing or consumption by the vehicle. In some implementations, the primary coupler 214 and the secondary coupler 218 are configured according to a mutual resonant relationship and when the resonant frequency of the secondary coupler 218 and the resonant frequency of the primary coupler 214 are very close and located in the near-field of the primary coupler 214, transmission losses between the CB and vehicle wireless power subsystems are minimal.

As stated, an efficient energy transfer occurs by coupling a large portion of the energy in the near-field of the primary coupler 214 to the secondary coupler 218 rather than propagating most of the energy in an electromagnetic wave to the far-field. When in the near-field, a coupling mode may be developed between the primary coupler 214 and the secondary coupler 218. The area around the couplers where the near-field coupling may occur is referred to herein as a "near-field coupling-mode region".

The primary power conversion module 212 and the secondary power conversion module 216 may both include an oscillator, a power amplifier, a filter, and a matching circuit (not shown) for efficient coupling via the couplers 214 and 218. The oscillator is configured to generate a desired frequency, which may be adjusted in response to an adjustment signal. The oscillator signal may be amplified by the power amplifier with an amplification amount responsive to control signals. The filter and matching circuit may be included to filter out harmonics or other unwanted frequencies and match the impedance of the power conversion module 212 to the wireless power coupler 214. The primary power conversion module 212 and secondary power conversion module 216 may each also include a rectifier and switching circuitry (not shown) to generate a suitable power output to charge the battery 222.

Primary and secondary couplers used in some implementations may be configured as "loop" antennas, and more specifically, multi-turn loop antennas, which may also be referred to herein as "magnetic" couplers. Loop (e.g., multi-turn loop) antennas may be configured to include an air core or a physical core such as a ferrite core. An air core loop antenna may allow the placement of other components within the core area. Physical core antennas including ferromagnetic or ferromagnetic materials may allow development of a stronger electromagnetic field and improved coupling.

Efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near-field of the primary coupler to the secondary coupler residing in the area where this near-field is established rather than propagating the energy from the primary coupler into free space.

The resonant frequency of the loop antennas is based on the inductance and capacitance of the loop antennas. Inductance in a loop antenna is generally simply the inductance created by the loop, whereas, capacitance is generally added to the loop antenna's inductance to create a resonant structure at a desired resonant frequency. As a non-limiting example, a capacitor may be added in series with the antenna to create a resonant circuit that generates a magnetic field. Accordingly, for larger diameter loop antennas, the size of capacitance needed to induce resonance decreases as the diameter or inductance of the loop increases. It is further noted that inductance may also depend on a number of turns of a loop antenna. Furthermore, as the diameter of the loop antenna increases, the efficient energy transfer area of the near-field increases. Of course, other resonant circuits are possible. As another non-limiting example, a capacitor may be placed in parallel between the two terminals of the loop antenna (i.e., a parallel resonant circuit).

Some implementations include coupling power between two couplers that are in the near-fields of each other. As stated, the near-field is an area around the coupler in which electromagnetic fields exist but may not propagate or radiate away from the coupler. Near-field coupling-mode regions are typically confined to a volume that is near the physical volume of the coupler e.g. within a radius of one sixth of the wavelength. In some implementations, magnetic type couplers such as single and multi-turn loop antennas may be used for both transmitting and receiving power since magnetic near-field amplitudes in practical implementations tend to be higher for magnetic type couplers in comparison to the electric near-fields of an electric-type antenna (e.g., a small dipole). This allows for potentially higher coupling between the pair of couplers. Another reason for relying on a substantially magnetic field is its low interaction with non-conductive dielectric materials in the environment. Electric antennas for wireless high power transmission may involve extremely high voltages. Furthermore, "electric" antennas (e.g., dipoles and monopoles) or a combination of magnetic and electric antennas are also contemplated.

Figure 3:
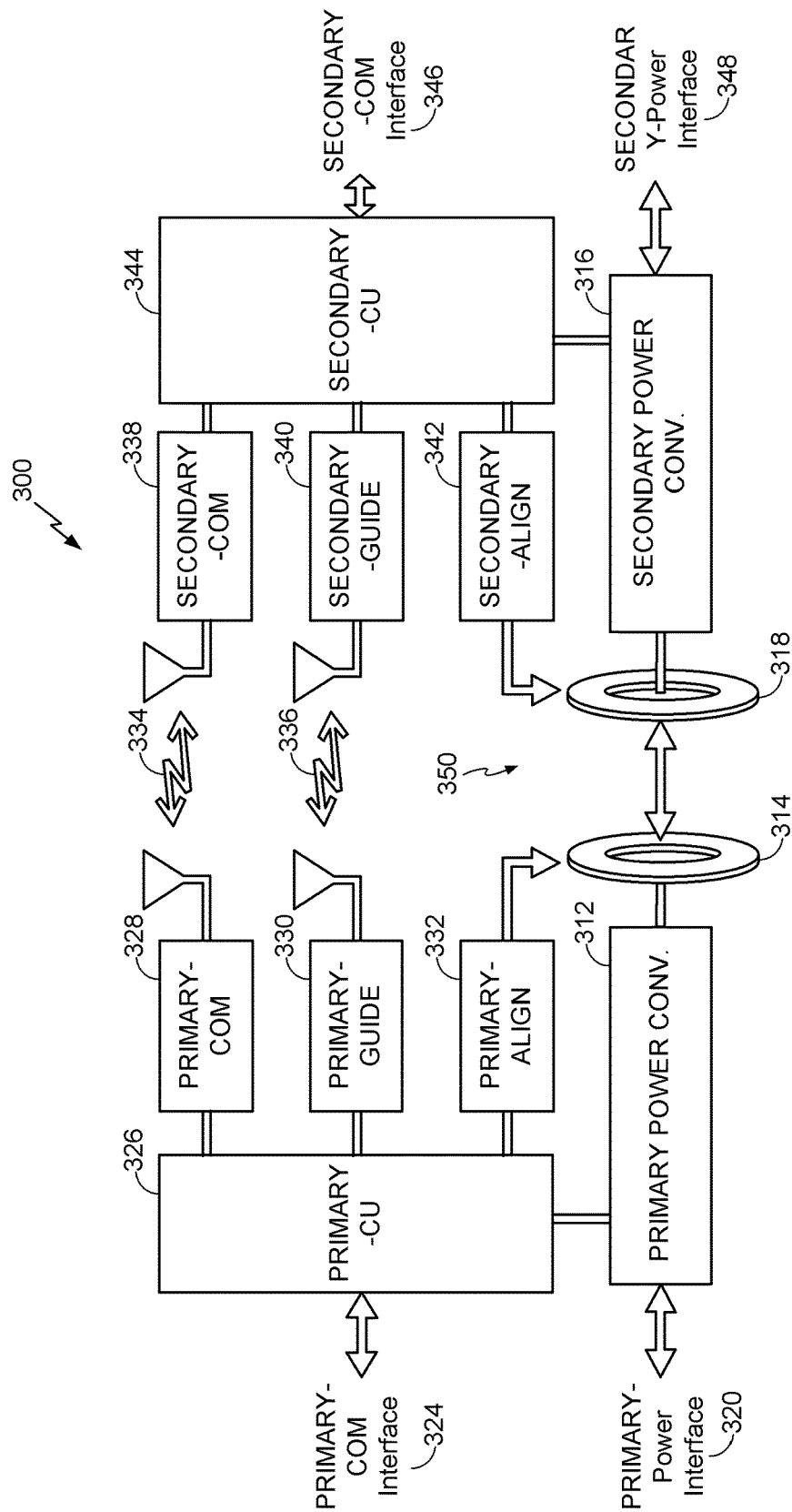
FIG. 3 is a detailed block diagram of a wireless power transfer system for a vehicle illustrating communication links, guidance links, and alignment systems for the primary coupler and the secondary coupler, in accordance with some implementations.

FIG. 3 is a detailed block diagram of a wireless power transfer system 300 for a vehicle illustrating communication links 334, guidance links 336, and alignment systems 350 for a primary coupler 314 and a secondary coupler 318, in accordance with some implementations. As with the some implementations of FIG. 2 and assuming energy flow towards the vehicle, in FIG. 3 the primary power conversion unit 312 receives AC or DC power from the primary power interface 320 and excites the primary coupler 314 at or near its resonant frequency. The secondary coupler 318, when in the near-field coupling-mode region of the primary coupler 314, receives energy from the near-field coupling-mode region to oscillate at or near the resonant frequency. The secondary power conversion unit 316 converts the oscillating signal from the secondary coupler 318 to a power signal suitable for charging the battery.

The system 300 may also include a primary communication unit 326 and a secondary communication unit 344, respectively. The primary communication unit 326 may include a communication interface to other systems (not shown) such as, for example, a computer, and a power distribution center. The secondary communication unit 344 may include a communication interface 346 to other systems such as, for example, an on-board computer on the vehicle, other battery charging controller, other electronic systems within the vehicles, and remote electronic systems.

The primary 326 and secondary 344 communication units may include subsystems or functions for specific application with separate communication channels therefore. These communications channels may be separate physical channels or just separate logical channels. As non-limiting examples, a primary alignment unit 332 may communicate with a secondary alignment unit 342 to provide a feedback mechanism for more closely aligning the primary coupler 314 and secondary coupler 318, either autonomously or with operator assistance. Similarly, a primary guide unit 330 may communicate with a secondary guide unit 340 to provide a feedback mechanism to guide an operator in aligning the primary coupler 314 and the secondary coupler 318. In addition, there may be a separate general-purpose communication channel 334 supported by the primary communication unit 328 and the secondary communication unit 338 for communicating other information between the primary and the vehicle. This information may include information about EV characteristics, battery characteristics, charging status, and power capabilities of the primary side and the vehicle, as well as maintenance and diagnostic data. These communication channels may be separate physical communication channels such as, for example, Bluetooth, zigbee, cellular, etc.

In addition, some communication may be performed via the wireless power link without using specific communications antennas. In other words, in some implementations, the wireless power coupler may also operate as a communications antenna. Thus, some implementations of the primary side may include a controller (not shown) for enabling keying-type protocols onto the wireless power path. By keying the transmit power level (e.g., Amplitude Shift Keying) at predefined intervals with a predefined protocol, the receiver of a communication can detect a serial communication from the transmitter of that communication. The primary power conversions module 312 may include a load sensing circuit (not shown) for detecting the presence or absence of active vehicle receivers in the vicinity of the near-field generated by the primary coupler 314. By way of example, a load sensing circuit may monitor the current flowing to a power amplifier, which is affected by the presence or absence of active receivers in the vicinity of the near-field generated by the primary coupler 314. Detection of changes to the loading on the power amplifier may be monitored by the controller for use in determining whether to enable the oscillator for transmitting energy, to communicate with an active receiver, or a combination thereof.

Vehicle circuitry may include switching circuitry (not shown) for connecting and disconnecting the secondary coupler 318 to the secondary power conversion unit 316. Disconnecting the secondary coupler 318 not only suspends charging, but also changes the "load" as "seen" by the primary coupler 314, which can be used to "cloak" the secondary coupler 318 from the primary coupler 314. The load changes can be detected if the primary coupler 314 includes the load sensing circuit. Accordingly, the primary has a mechanism for determining when secondary couplers are present in the primary coupler's near-field.

Figure 4:
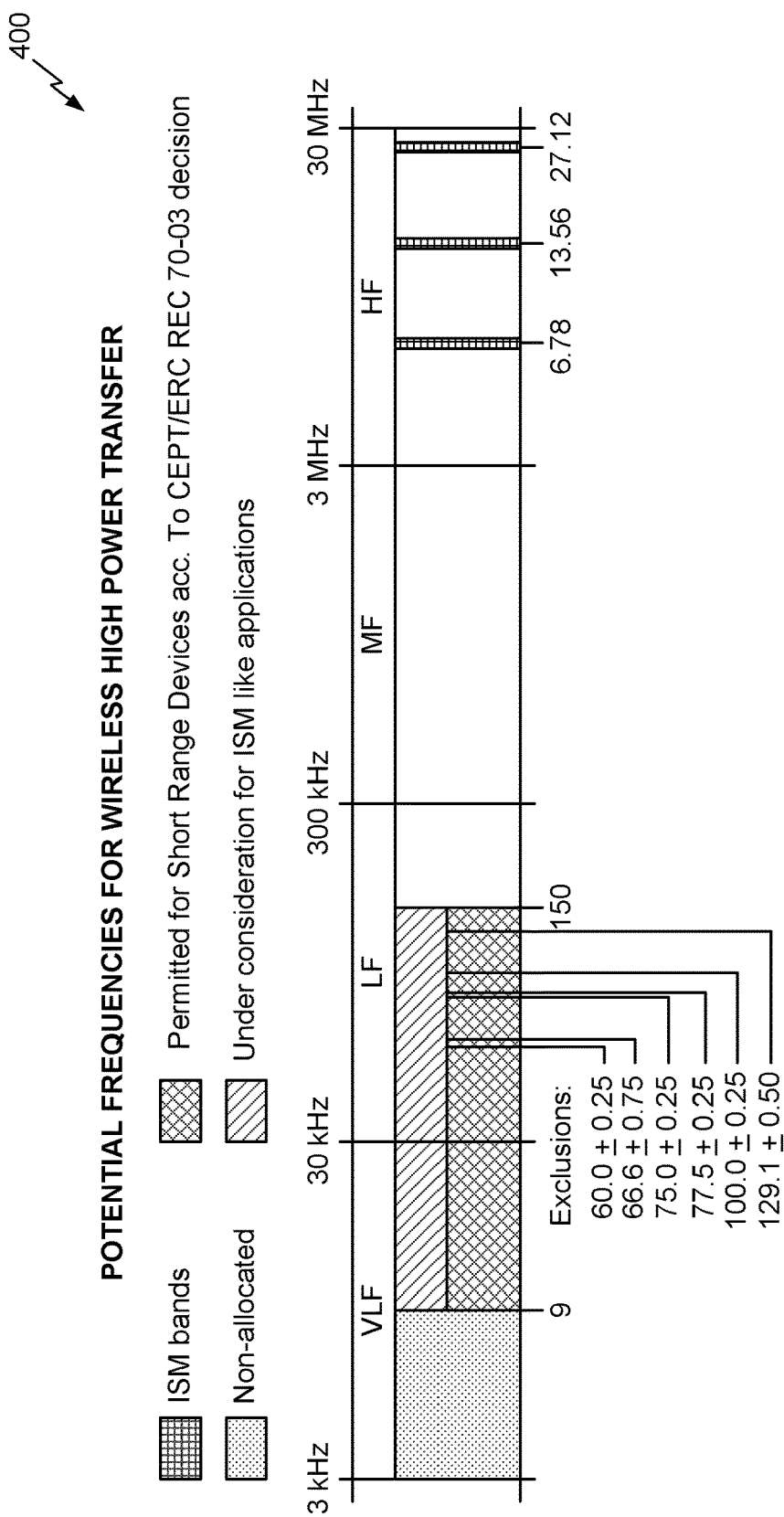
FIG. 4 illustrates a frequency spectrum showing various frequencies that may be available for wireless charging of vehicles, in accordance with some implementations.

FIG. 4 illustrates a frequency spectrum 400 showing various frequencies that may be available and suitable for wireless charging of vehicles, in accordance with some implementations. Some potential, non-limiting frequency ranges for wireless high power transfer to vehicles include: VLF in a 3 kHz to 30 kHz band, lower LF in a 30 kHz to 300 kHz band (e.g., for ISM-like applications) with some exclusions, HF 6.78 MHz (ITU-R ISM-Band 6.765-6.795 MHz), HF 13.56 MHz (ITU-R ISM-Band 13.553-13.567), and HF 27.12 MHz (ITU-R ISM-Band 26.957-27.283).

Figure 5:
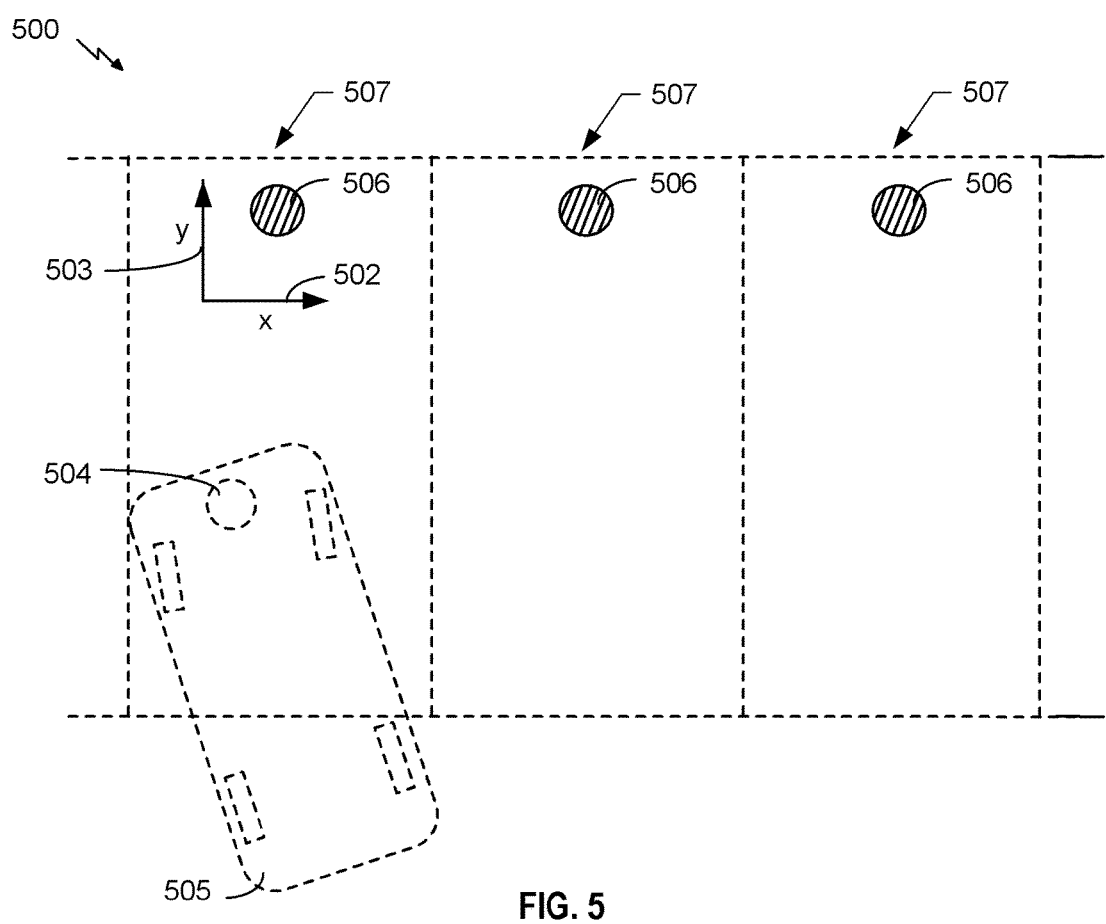
FIG. 5 illustrates a parking lot comprising a plurality of parking spaces and a charging base positioned within each parking space, in accordance with some implementations.

FIG. 5 illustrates a parking lot 500 comprising a plurality of parking spaces 507 and a charging base 506 positioned within each parking space 507, in accordance with some implementations. It is noted that a "parking space" may also be referred to herein as a "parking area." To enhance the efficiency of a vehicle wireless power transfer system, a vehicle 505 may be aligned along an X direction (depicted by arrow 502 in FIG. 5) and a Y direction (depicted by arrow 503 in FIG. 5) to enable a wireless power secondary coupler 504 within the vehicle 505 to be adequately aligned with the wireless power charging base 506 within an associated parking space 507. Although the parking spaces 507 in FIG. 5 are illustrated as having the single charging base 506, implementations are not so limited. Rather, the parking spaces 507 may have one or more charging bases 506.

Furthermore, some implementations are applicable to parking lots having one or more parking spaces, wherein at least one parking space within a parking lot may comprise a charging base. In some implementations, guidance systems (not shown) may be used to assist a vehicle operator in positioning the vehicle 505 in the parking space 507 to enable the secondary coupler 504 within the vehicle 505 to be aligned with the charging base 506. Exemplary guidance systems may include electronic-based approaches (e.g., radio positioning, direction finding principles, and/or optical, quasi-optical and/or ultrasonic sensing methods) or mechanical-based approaches (e.g., vehicle wheel guides, tracks or stops), or any combination thereof, for assisting a vehicle operator in positioning the vehicle 505 to enable the coupler 504 within the vehicle 505 to be adequately aligned with a charging coupler within the charging base 506.

Figure 6:
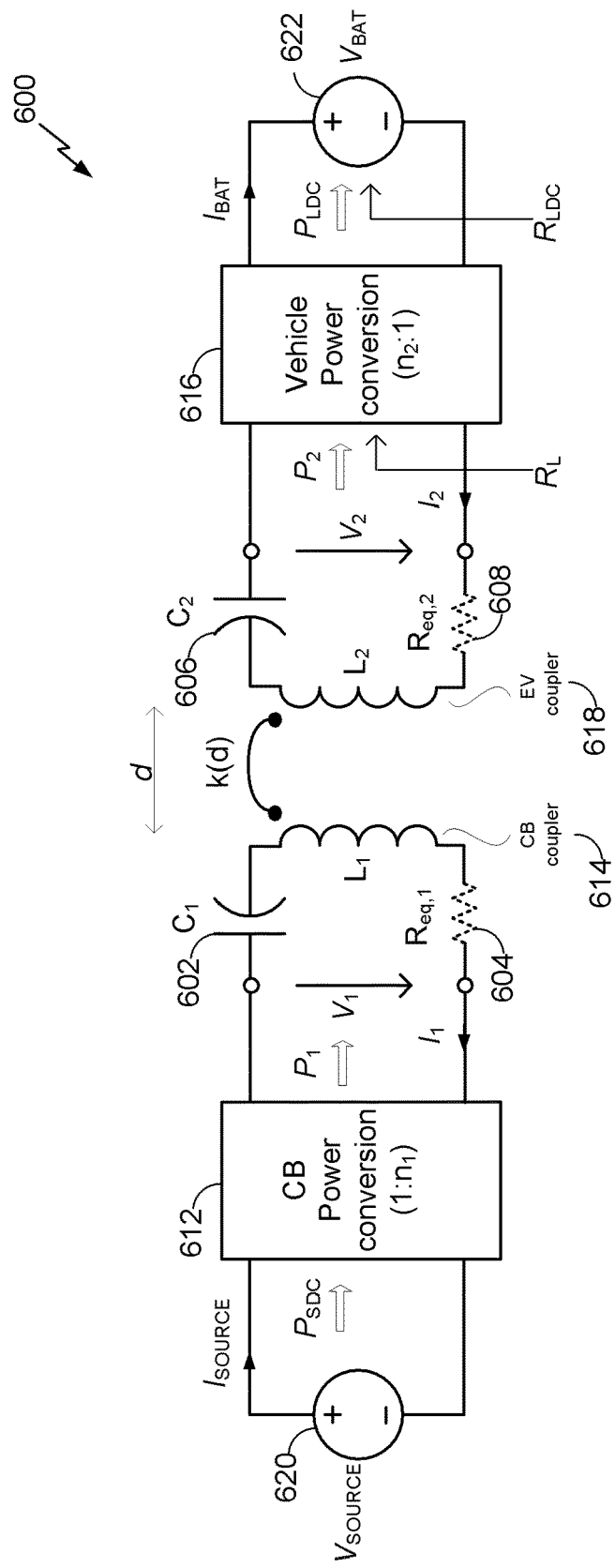
FIG. 6 illustrates a simplified circuit diagram of a wireless power transfer system based on a series resonant inductive link, in accordance with some implementations.

FIG. 6 illustrates a simplified circuit diagram of a wireless power transfer system 600 based on a series resonant inductive link, in accordance with some implementations. As shown in FIG. 6, a power supply 620 may provide a voltage $V_{SOURCE}$ for driving a current $I_{SOURCE}$ to a primary power conversion module 612. The primary power conversion module 612 may be configured to convert the voltage $V_{SOURCE}$ into an AC voltage $V_1$ driving a primary current $I_1$. The output of the primary power conversion module 612 may be applied to a series-connected capacitor 602 and primary coupler 614 (represented e.g., by inductor L1). An equivalent resistance $R_{eq,1}$ connected in series with the capacitor 602 and the primary coupler 614 represents the losses inherent to at least the coupler 614 and the capacitor 602.

The wireless power transfer system 600 may further include, on a vehicle side, a series-connected capacitor 606 and secondary coupler 618 (represented e.g., by inductor L2) and an equivalent resistance $R_{eq,2}$, which represents the losses inherent to at least the coupler 618 and the capacitor 606. The couplers 614 and 618 (represented e.g., by inductors L1 and L2) may be separated by a distance d and may have a mutual coupling coefficient k(d) that is a function of the distance d. The primary current $I_1$ flowing through the primary coupler 614 generates a magnetic field, which may induce a voltage in the secondary coupler 618. This may cause a secondary current $I_2$ and an AC voltage $V_2$ to appear at the input of a secondary power conversion module 616. The secondary power conversion module 616 may convert the AC voltage $V_2$ into a DC load voltage $V_{BAT}$ driving a DC load current $I_{BAT}$ into a load 622 (e.g., a battery).

In some implementations, both the power source 620 and the load 622 (e.g., the load or battery) are assumed constant voltage with voltages $V_{SOURCE}$ and $V_{BAT}$ respectively, reflecting the characteristics of the power grid and the vehicle battery, respectively. Constant voltage shall be understood in the sense of a virtually zero source resistance and zero load resistance, respectively. Moreover, the circuit diagram of FIG. 6 as well as the following description assumes energy transfer from the primary side power supply 620 to the vehicle-side load or battery 622. However, this does not exclude energy transfer in the reverse direction, for example, for purposes of vehicle-to-grid (V2G) energy transfer, provided that power conversion supports reverse power flow (bidirectional, four quadrant control).

In the some implementations illustrated in FIG. 6, a transformation ratio $1:n_1$ may be attributed to primary power conversion by the primary power conversion module 612 and may be defined as:

$$1:n_1 = V_{SOURCE}:V_1 \qquad \text{Equation 1}$$

where $V_{SOURCE}$ and $V_1$ denote the DC input voltage and the r.m.s. voltage of the fundamental frequency at AC output, respectively.

Vehicle-side power conversion performs reverse operation reconverting AC power received by secondary coupler 618 back to DC power. Correspondingly, a transformation ratio $n_2:1$ is attributed to primary power conversion by the secondary power conversion module 616, which may be defined as:

$$n_2:1 = V_2:V_{BAT} \qquad \text{Equation 2}$$

where $V_2$ and $V_{BAT}$ denote the r.m.s. voltage of the fundamental frequency at AC input and the DC output voltage, respectively.

Theory shows that efficiency of an inductively coupled resonant link reaches a maximum if the resonance frequency of both the primary coupler 614 and the secondary coupler 618 are adjusted to the operating frequency where primary resonance frequency refers to the resonance frequency that can be determined with an open circuited secondary coupler and where secondary resonance frequency refers to the resonance frequency that can be determined with an open circuited primary coupler. This is valid for any coupling coefficient 0<k(d)<1. In practical implementations other tuning schemes may apply for various reasons. However these may not be optimum in a theoretical sense e.g. excluding power conversion aspects. As an example, power conversion may require the system to be operated slightly off resonance, if low loss zero current switching is targeted under all conditions.

Assuming switched-mode power conversion in both of the primary power conversion module 612 and the secondary power conversion module 616, with a 50% duty cycle, voltage $V_1$ and $V_2$ are both square waves. Though filtered by the effect of resonance, coupler currents $I_1$ and $I_2$ are generally non-sinusoidal with harmonics content depending on the coupling coefficient k(d). Thus, some power is transmitted via the harmonics. In most cases however, energy transfer via harmonics is negligible.

For dimensioning a symmetric coupling system (L1=L2, and $R_{eq,1}=R_{eq,1}$) an optimum coupler inductance for maximizing efficiency may be calculated as:

$$L_{opt} \cong \frac{R_{L,0}}{\omega_0 k(d)} \qquad \text{Equation 3}$$

given coupling coefficient k(d), angular operating frequency $\omega_0$, and load resistance $R_L$ as presented by secondary power conversion at fundamental frequency. However, if possible, varying coupler inductance should be avoided as, in general, it will involve complex switching circuitry or mechanical gear, additional losses and non-optimum use of coupler volume and, thus, reduction of the quality factor of the system, as well as variable capacitance to maintain resonance, thus adding to complexity. The use of an additional coupler matching network acting as a transformer may have similar drawbacks.

A less complex and more economical solution may be achieved by using power conversion to provide the required variable transformation ratio. Changing primary-side transformation ratio $n_1$ is equivalent to power control since it will largely affect energy transfer rate across the link. Changing secondary-side transformation ratio $n_2$ accordingly will ensure that the wireless power link is operated efficiently. It may be called load adaptation.

Several methods for power control and load adaptation have been proposed with some allowing for continuous change of transformation ratio, however sacrificing zero current switching (ZCS), thus leads to some increased switching loss and stress of switching devices. Other methods may maintain ZCS condition, but permit change of transformation ratio only in coarse steps.

One method to coarsely change transformation ratio that may involve low losses is to change the operational mode of a bridge within the primary power conversion module 612 and/or the secondary power conversion module 616 (e.g., from full-bridge mode to half-bridge mode or vice versa). This method is further described herein below.

Figure 7:
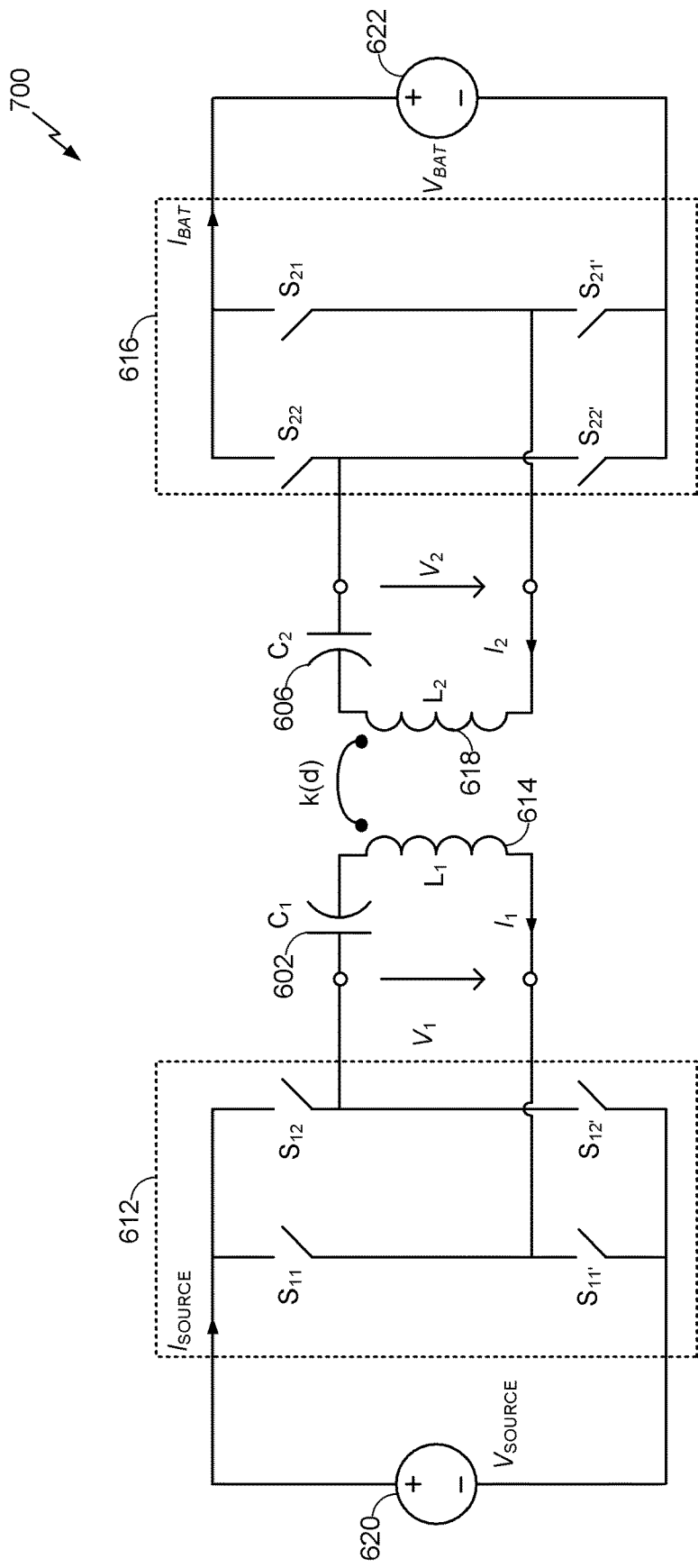
FIG. 7 illustrates a schematic diagram of a wireless power transfer system, further illustrating adaptable power conversion reconfigurable as a full-bridge power conversion and as a half-bridge power conversion, in accordance with some implementations.

FIG. 7 illustrates a schematic diagram of a wireless power transfer system 700, further illustrating adaptable power conversion reconfigurable as a full-bridge power conversion and as a half-bridge power conversion, in accordance with some implementations. As shown, the primary power conversion module 612 may further comprise switches $S_{11}$, $S_{12}$, $S_{11'}$ and $S_{12'}$, which may represent FET or IGBT solid state devices. The secondary power conversion module 616 may further comprise switches $S_{22}$, $S_{21}$, $S_{22'}$ and $S_{21'}$, which may also represent FET or IGBT solid state devices.

In a full-bridge (F-bridge or FB) mode or half-bridge (H-bridge or HB) mode, all switches of power conversion are toggling in a manner that $S_{j1}$ and $S_{j2'}$ are closed at the same time. When $S_{j1}$ is closed then $S_{j2}$ and $S_{j1'}$ are open and vice versa. This applies to primary-side and secondary-side power conversion ($j \in \{1,2\}$).

In a half-bridge mode, e.g., only $S_{11}$ and $S_{11'}$ are toggling, and $S_{12'}$ and $S_{12}$ are static. When is closed is open and vice versa. In the static half-bridge, e.g., $S_{12'}$ may be closed.

It can be shown that a full-bridge inverter switching at 50% duty cycle and driven by a DC voltage source transforms a DC input voltage level into an AC output voltage level (r.m.s.) of the fundamental by a ratio:

$$1:n_1 = 1:\frac{\sqrt{8}}{\pi} \qquad \text{Equation 4}$$

which is approximately 1:1. Correspondingly, a half-bridge inverter switching at 50% duty cycle and driven by a DC voltage source transforms by:

$$1:n_1 = 1:\frac{\sqrt{2}}{\pi} \qquad \text{Equation 5}$$

which is approximately 1:½.

Likewise, it can be shown that a full-bridge rectifier switching at 50% duty cycle and driving a DC voltage load transforms an AC voltage level (r.m.s) of the fundamental into a DC voltage level:

$$n_2:1 = \frac{\sqrt{8}}{\pi}:1 \qquad \text{Equation 6}$$

which is approximately 1:1. Correspondingly, a half-bridge rectifier switching at 50% duty cycle and driving a DC voltage load transforms by:

$$n_2:1 = \frac{\sqrt{2}}{\pi}:1 \qquad \text{Equation 7}$$

which is approximately ½:1.

The corresponding currents are transformed by the reciprocal ratio.

Moreover, it can be shown that a full-bridge inverter switching at 50% duty cycle and driven by a DC current source transforms a DC input current level into an AC output current level (r.ms.) of the fundamental by a ratio:

$$1:n_1 = 1:\frac{\sqrt{8}}{\pi} \qquad \text{Equation 8}$$

Correspondingly, a half-bridge rectifier switching at 50% duty cycle and driving a DC current load transforms by a ratio:

$$n_2:1 = \frac{\sqrt{2}}{\pi}:1 \qquad \text{Equation 9}$$

Likewise, it can be shown that a full-bridge rectifier switching at 50% duty cycle and driving a DC current load transforms an AC voltage level (r.m.s) of the fundamental into a DC current level:

$$n_2:1 = \frac{\sqrt{8}}{\pi}:1 \qquad \text{Equation 10}$$

which is approximately 1:1. Correspondingly, a half-bridge rectifier switching at 50% duty cycle and driving a DC current load transforms by a ratio:

$$n_2:1 = \frac{\sqrt{2}}{\pi}:1 \qquad \text{Equation 11}$$

The corresponding voltages are transformed by the reciprocal ratio.

Those skilled in the art would appreciate that a DC voltage driven inverter is most suitable in conjunction with a series tuned primary whilst a DC current source driven inverter is most suitable in conjunction with a parallel tuned primary. Correspondingly, a rectifier with a DC voltage load is most suitable in conjunction with a series tuned secondary whilst a rectifier with a DC current load is most suitable in conjunction with a parallel tuned secondary.

Figure 8:
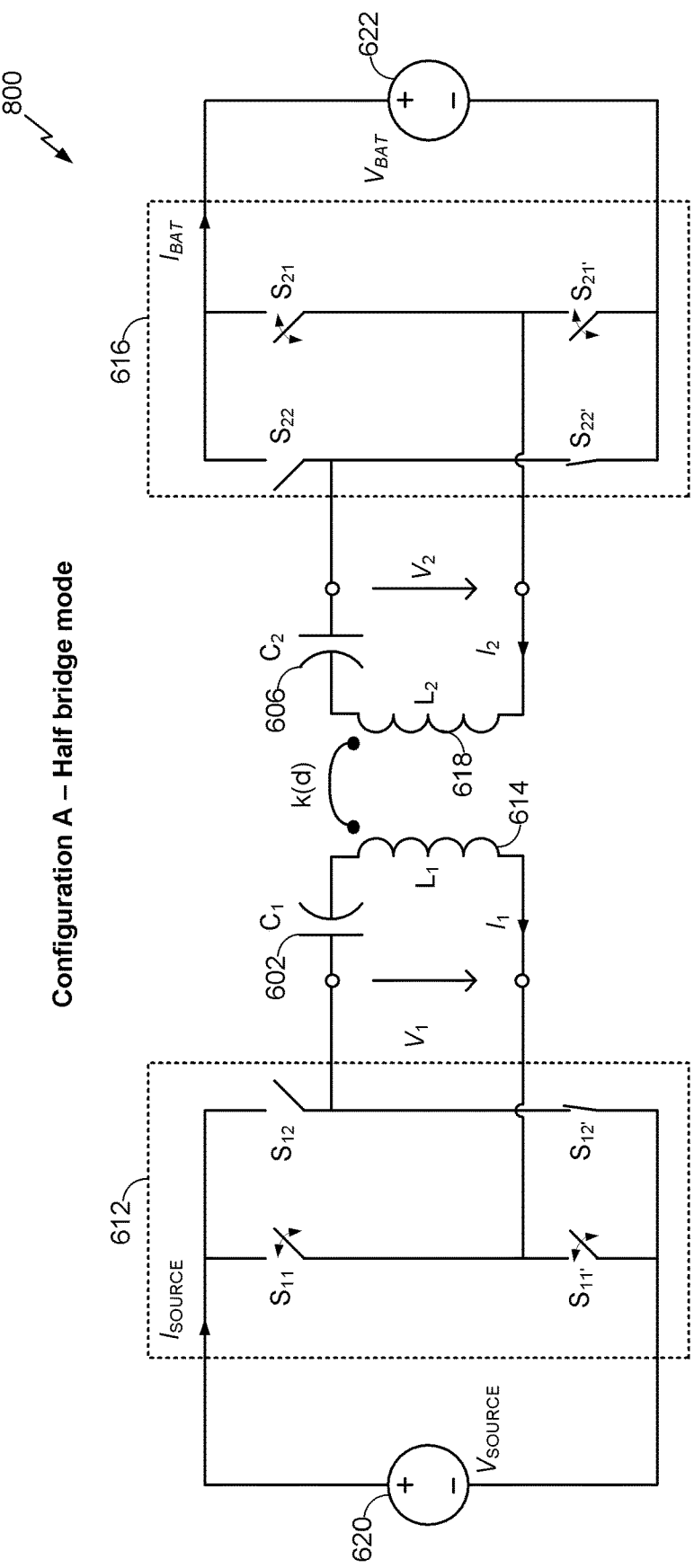
FIG. 8 illustrates the wireless power transfer system of FIG. 7 in a half-bridge configuration (configuration A), in accordance with some implementations.

FIG. 8 illustrates the wireless power transfer system 700 of FIG. 7 in a half-bridge configuration 800 (configuration A), in accordance with some implementations. Configuration A may preferably be used in looser coupling conditions, and/or when battery load resistance is relatively high. A relatively high battery load resistance may result at lower charge power levels or when battery voltage is high. As shown in FIG. 8, switch $S_{12}$ within the primary power conversion module 612 (e.g., inverter) remains open, and switch $S_{12'}$ remains closed while switches $S_{11}$ and $S_{11'}$ inversely alternate opening and closing. Similarly, switch $S_{21}$ within the secondary power conversion module 616

(e.g., rectifier) remains open, and switch $S_{21'}$ remains closed while switches $S_{22}$ and $S_{22'}$ inversely alternate opening and closing.

Figure 9:
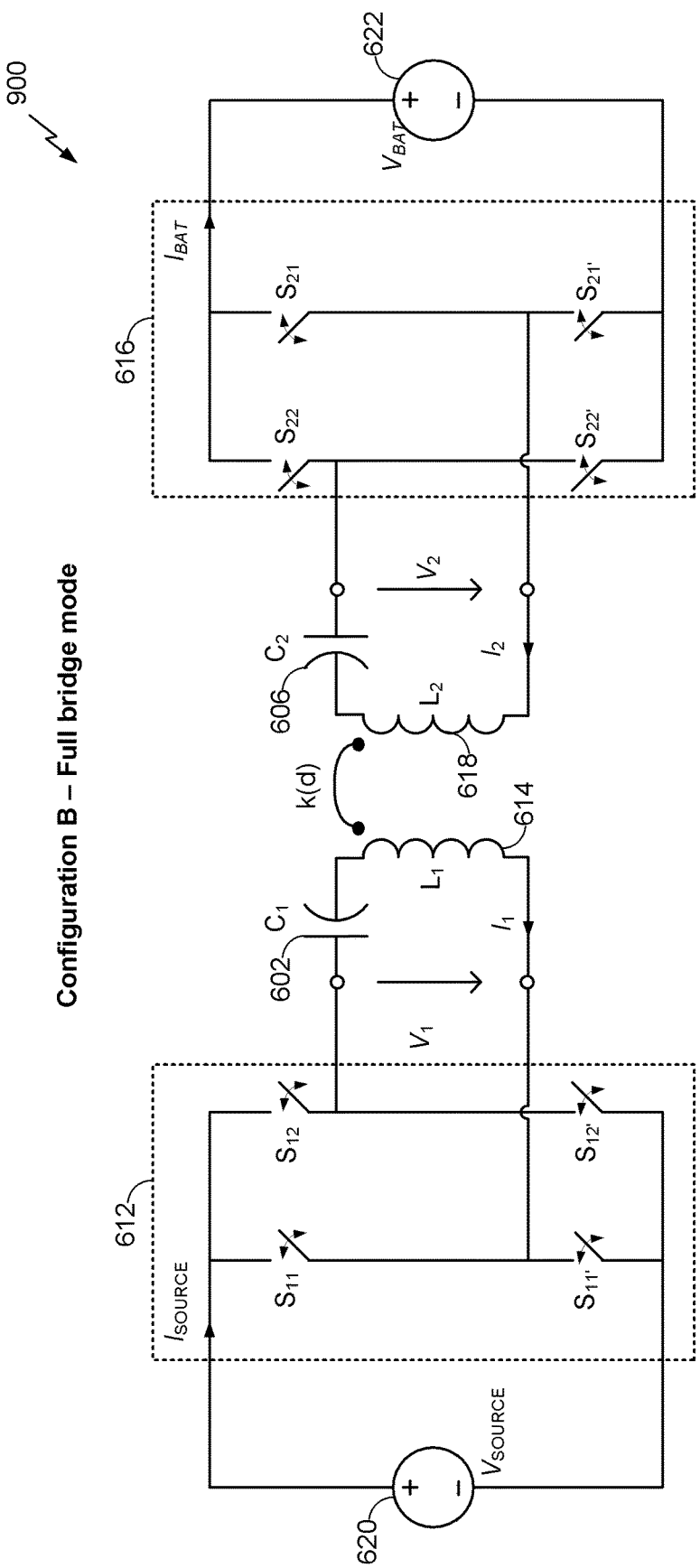
FIG. 9 illustrates the wireless power transfer system of FIG. 7 in a full-bridge configuration (configuration B), in accordance with some implementations.

FIG. 9 illustrates the wireless power transfer system 700 of FIG. 7 in a full-bridge configuration 900 (configuration B), in accordance with some implementations. Configuration B may preferably be used in tighter coupling conditions, and/or when battery load resistance is relatively low. A relatively low battery load resistance may result at higher charge power levels or when battery voltage is low. As shown in FIG. 9, each of switches $S_{11}$, $S_{11'}$, $S_{12}$ and $S_{12'}$ within the primary power conversion module 612 (e.g., inverter) alternate between open and closed states such that when $S_{11}$ is open $S_{11'}$ is closed and vice versa, when $S_{12}$ is open $S_{12'}$ is closed and vice versa, and when $S_{11'}$ is closed, $S_{12}$ is also closed and vice versa. Similarly, each of switches $S_{21}$, $S_{21'}$, $S_{22}$ and $S_{22'}$ within the secondary power conversion module 616 (e.g., rectifier) alternate between open and closed states such that when $S_{21}$ is open $S_{21'}$ is closed and vice versa, when $S_{22}$ is open $S_{22'}$ is closed and vice versa, and when $S_{21'}$ is closed, $S_{22}$ is also closed and vice versa.

Summarizing, an adaptive system and a method to transfer energy from a voltage source to a voltage load is disclosed, where the system is adaptable to operate at or as near as possible to a maximum efficiency (e.g., at a non-maximum efficiency), while also operating within defined system operating limitations (e.g., optimally exploiting a regulatory electromagnetic field strength limit, a duty cycle limit for one or both of a primary side inverter and a secondary side AC-switched rectifier, a desired wireless power output, a current limit and/or a voltage limit for one or both of the primary side and the secondary side). It can be shown that such an adaptive system can be optimally operated in looser coupling conditions with a lower power level or in tighter coupling conditions with a higher power level by selecting a mode of operation of transmit and receive side power conversion to either half-bridge mode or full-bridge mode, respectively.

Figure 10:
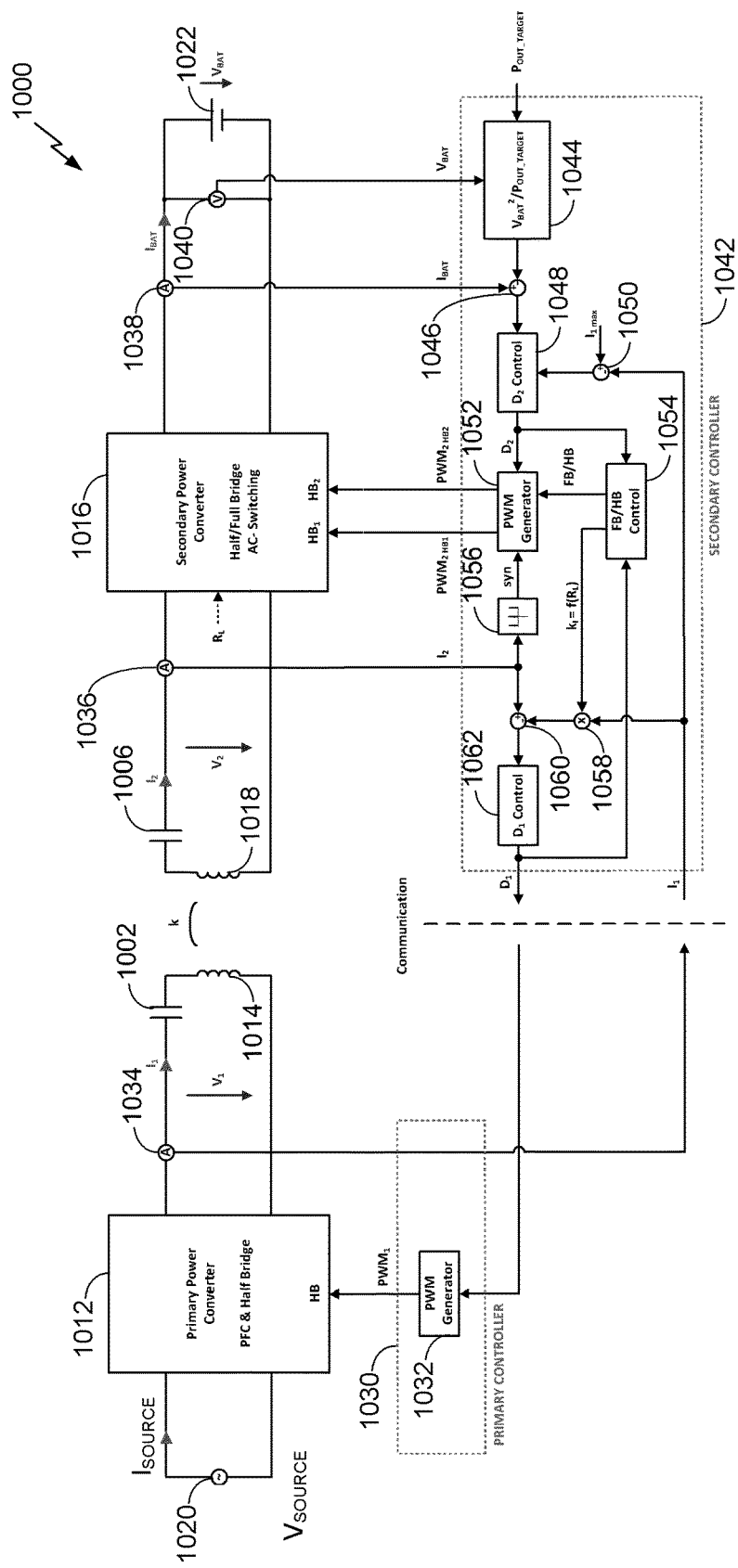
FIG. 10 illustrates a schematic diagram of a wireless power transfer system having an adaptable and reconfigurable rectifier bridge in secondary power conversion, in accordance with some implementations.

FIG. 10 illustrates a schematic diagram of a wireless power transfer system 1000 having an adaptable and reconfigurable rectifier bridge in secondary power conversion, in accordance with some implementations. The wireless power transfer system 1000 shown in FIG. 10 may comprise a primary power converter 1012 with a half bridge inverter and secondary power converter 1016 with a reconfigurable active (e.g. AC-switched) rectifier, similar to that previously described in connection with FIGS. 7-9. The rectifier bridge may be configured to operate according to the half-bridge and full-bridge operating modes in order to coarsely adapt transformation ratio $n_2$:1, as will also be described in more detail below. Such an implementation may be the result of a cost/complexity vs. performance trade-off As shown in FIG. 10, a primary subsystem (e.g., a stationary-side of the wireless power transfer system 1000) may comprise a power source 1020 providing a voltage $V_{SOURCE}$ driving a current $I_{SOURCE}$ into the primary power converter 1012. The primary power converter 1012 may comprise a half bridge inverter. The primary power converter 1012 may output an AC voltage $V_1$ driving an AC current $I_1$ through a series-connected (e.g., series tuned) capacitor 1002 and a coupler 1014 (represented by an inductor).

In some implementations, reference may be made to an "essentially series tuned" system. In such implementations, "essentially series tuned" may refer to a system in which the capacitor that compensates for a major portion of reactance of the coupler (e.g., inductor utilized to generate the magnetic field for wirelessly transferring power) is connected in series to the inductor. There may be other additional tuning and matching components connected in series or parallel. Similarly, in some other implementations, reference may be made to an "essentially parallel tuned" system. In such other implementations, "essentially parallel tuned" may refer to a system in which the capacitor that compensates for a major portion of reactance of the coupler (e.g., inductor utilized to generate the magnetic field for wirelessly transferring power) is connected in parallel to the inductor. There may be other additional tuning and matching components connected in series or parallel.

The primary power converter 1012 may be controlled or driven by a PWM signal $PWM_1$ provided by a primary controller 1030 comprising a primary PWM generator 1032. The primary PWM generator 1032 may generate the $PWM_1$ signal based on a first duty cycle control signal ($D_1$) communicated to the primary PWM generator 1032 from a secondary subsystem via a communication link. Thus, the primary controller 1030 may be a slave controller configured to control the output voltage $V_1$ by controlling the duty cycle of the PWM signal $PWM_1$, based on of the first duty cycle control signal $D_1$, via the wireless communication link with the secondary subsystem. Accordingly, the primary subsystem may further comprise means for communicating with the secondary subsystem (not shown in FIG. 10).

The primary subsystem may further include a current sensor 1034 for measuring, detecting or determining the primary current $I_1$ circulating through the series-connected capacitor 1002 and coupler 1014. The primary subsystem may communicate an indication of the sensed current $I_1$ to the secondary subsystem via a wireless communication link. In some implementations, the primary controller may also be configured to vary the DC link voltage if the primary power converter 1012 comprises e.g., a cascade of an AC-to-DC converter (e.g., a rectifier and a power factor correction stage (PFC)) and a DC-to-AC converter (e.g., an inverter) (not shown in detail in FIG. 10).

In some implementations, the input-to-output voltage transformation ratio of the primary power converter 1012 may be about $1:n_1$ or $n_1:1$ if operated in the FB-mode and about $1:(n_1/2)$ or $(n_1/2):1$ if operated in the HB-mode, depending on the topology of a secondary power converter 1016 in the secondary subsystem. In such implementations, reducing the duty cycle of the PWM signal $PWM_1$ will generally decrease the transformation factor $n_1$ in both the FB and HB modes.

As further shown in FIG. 10, the secondary subsystem (e.g., the vehicle-side of the wireless power transfer system 1000) may comprise a series-connected (e.g., series-tuned) capacitor 1006 and coupler 1018 (represented by an inductor) connected to a secondary power converter 1016 including an actively switched (e.g. AC-switched) rectifier, as previously described in connection with FIGS. 7-9. The secondary power converter 1016 may be configured to receive a secondary current $I_2$ driven by the voltage (not shown in FIG. 10) that is induced into the secondary coupler 1018 and output a DC voltage $V_{bat}$ driving DC current $I_{bat}$ into the vehicle battery 1022.

The secondary subsystem may further comprise a secondary controller 1042 configured to receive at least the indication of the sensed current $I_1$ from the primary subsystem via the communication link, an indication of the secondary current $I_2$, an indication of the DC current $I_{bat}$, and an indication of the DC voltage $V_{bat}$ from within the secondary subsystem. Thus, the secondary subsystem may further comprise means for communicating with the primary subsystem, a current sensor 1036 for measuring, detecting or determining the current $I_2$, a current sensor 1038 for measuring, detecting or determining the current $I_{bat}$, and a voltage sensor 1040 for measuring, detecting or determining the voltage $V_{bat}$.

The secondary controller 1042 may be a master controller for both the primary and secondary subsystems, and may include a secondary PWM generator 1052, a target DC output current computer 1044, a secondary PWM duty cycle controller 1048, a primary PWM duty cycle controller 1062, and a bridge mode and current ratio controller 1054.

The secondary controller 1042 may control the secondary power converter 1016 by controlling a duty cycle of the PWM waveforms $PWM_{2,HB1}$ and $PWM_{2,HB2}$, generated by the secondary PWM generator 1052 for driving each half-bridge of the secondary power converter 1016 separately, as well as controlling the operational mode (e.g., HB or FB mode) of the secondary controller 1042. For example, in HB-mode, the secondary PWM generator 1052 generates only the $PWM_{2,HB1}$ waveform, while the $PWM_{2,HB2}$ waveform remains static (e.g., holding the switches in the second half bridge in respective static open/closed states). In the FB-mode, the secondary PWM generator 1052 generates the $PWM_{2,HB1}$ waveform and the $PWM_{2,HB2}$ waveform. In order to synchronize the secondary PWM waveforms $PWM_{2,HB1}$ and $PWM_{2,HB2}$ with the current $I_2$ in terms of both frequency and phase, the secondary controller 1042 may further comprise a synchronizer 1056 that receives an indication of the current $I_2$ from the current sensor 1036 and outputs a synchronizing signal to the secondary PWM generator 1052.

Furthermore, within the secondary controller 1042, the target DC output current computer 1044 may receive an indication of the DC voltage $V_{bat}$ from the voltage sensor 1040 and a request for or demand of a target output power $P_{out\_target}$ from a battery management system (not shown) of the vehicle and determine or calculate the target DC output current $I_{bat,target}$ according to:

$$I_{bat,target} = \frac{V_{bat}^2}{P_{out\_target}} \qquad \text{Equation 12}$$

The target DC output current computer 1044 then compares the calculated $I_{bat,target}$ with the actual $I_{bat}$ value utilizing a summer 1046, where $I_{bat,target}$ is subtracted from $I_{bat}$ according to:

$$\Delta I_{bat} = I_{bat} - I_{bat,target} \qquad \text{Equation 13}$$

$\Delta I_{bat}$ is output from the summer 1046 and input to the secondary PWM duty cycle controller 1048. In order to ensure that the primary current $I_1$ never exceeds a maximum primary current $I_{1max}$, the secondary PWM duty cycle controller 1048 also receives an input from a summer 1050, which compares the value of the primary current $I_1$, received from the primary subsystem via the communication link, with a maximum primary current $I_{1max}$ according to:

$$\Delta I_1 = I_1 - I_{1max} \qquad \text{Equation 14}$$

The secondary PWM duty cycle controller 1048 may then adjust its control output $D_2$ based on the value of $\Delta I_{bat}$, in order to minimize the value of $\Delta I_{bat}$. The control output $D_2$ of the controller 1048 is fed into the secondary PWM generator 1052, which uses it to adjust the duty cycle of the signals $PWM_{2,HB1}$ and $PWM_{2,HB2}$ in accordance with the value $D_2$.

The primary PWM duty cycle controller 1062 may also adjust its control output $D_1$, which is communicated to the primary PWM generator 1032 of the primary controller in the primary subsystem via a wireless communications link, based on a comparison of the secondary current $I_2$ and the primary current $I_1$ multiplied by a coefficient $k_i$, according to:

$$\Delta I_{21} = I_2 - (I_1 \times k_1) \qquad \text{Equation 15}$$

The value of $k_i$ corresponds to a load resistance $R_L$ appearing at the input of the secondary power converter 1016 that is largely based on whether the secondary power converter 1016 is operating in the FB mode or in the HB mode.

In order to make such a comparison, the bridge mode and current ratio controller 1054 may be configured to receive the control output $D_2$ of the secondary PWM duty cycle controller 1048 and the control output $D_1$ of the primary PWM duty cycle controller 1062 and to output the coefficient $k_i$. A multiplier 1058 receives, as inputs, the coefficient $k_i$ from the bridge mode and current ratio controller 1054 and the indication of the primary current $I_1$ from the primary subsystem via the communication link, and outputs the result to a summer 1060. The summer 1060 receives, as inputs, the indication of the current $I_2$ from the current sensor 1036 and the output from the multiplier 1058, and outputs an indication of $\Delta I_{21}$ to the primary PWM duty cycle controller 1062 according to Equation 15. The primary PWM duty cycle controller 1062 may then adjust its control output $D_1$ based on the value of $\Delta I_{21}$, in order to minimize the value of $\Delta I_{21}$.

The control output $D_1$ of the controller 1062 is sent to the primary PWM generator 1032 via the communications link and used to adjust the duty cycle of the PWM signal $PWM_1$ in accordance with the value $D_1$.

The bridge mode and current ratio controller 1054 may determine whether the values $D_1$ and/or $D_2$ (corresponding to duty cycles of $PWM_1$ and/or $PWM_2$, respectively) have exceeded any associated lower or upper limits. If either of the values $D_1$ or $D_2$ have exceeded the associated lower or upper limits, the bridge mode and current ratio controller 1054 may adjust a control output to the secondary PWM generator 1052, which instructs the secondary PWM generator 1052 to shift from the FB mode to the HB mode, or vice versa. In some implementations, the upper limits for the duty cycles may be defined by the maximum duty cycle (e.g., 50%) and the lower limits for the duty cycles may be defined by system design aspects such as switching losses and/or peak current limitations of the switches within either of the primary power converter 1012 and the secondary power converter 1016. Thus, the bridge mode and current ratio controller 1054 is configured to ultimately select the FB or HB mode for utilization by the secondary power converter 1016 and to select the coefficient $k_i$ for the comparison of the primary current $I_1$ and the secondary current $I_2$.

In some implementations, the input-to-output voltage transformation ratio of the secondary power converter 1016 may be $1:n_2$ or $n_2:1$ if operated in the FB-mode and about $1:(n_2/2)$ or $(n_2/2):1$ if operated in the HB-mode, depending on the topology of a secondary power converter 1016. In such implementations, reducing the duty cycle of the signals $PWM_{2,HB1}$ and $PWM_{2,HB2}$ with generally decrease the transformation factor $n_2$ in both the FB and HB modes.

Accordingly, the secondary controller 1042 is configured to deliver the target output power $P_{out\_target}$ as requested by the battery management system (not shown) at as close as possible to the maximum efficiency as calculated based on measured or estimated power losses and given the limitations and constraints of the wireless power transfer system. The secondary controller 1042 accomplishes this outcome by adjusting the primary power converter output voltage $V_1$ (by adjusting the duty cycle of the $PWM_1$ signal) and by adjusting the load resistance $R_L$ presented at the input of the secondary power converter 1016 (by adjusting the duty cycle of the of the $PWM_{2,HB1}$ and $PWM_{2,HB2}$ signals, and by selection of the FB or HB mode of the secondary power converter 1016). Thus, in some implementations, means for adjusting an input resistance of a rectifier (or means for rectifying) to a first value may comprise one or more components of the secondary controller 1042. Similarly, in some implementations, means for adjusting an input resistance of a rectifier (or means for rectifying) to a second value may comprise one or more components of the secondary controller 1042.

Regarding the load resistance $R_L$, resonant IPT theory shows that wireless power transfer efficiency reaches a maximum when $R_L$ is equal to an optimum load resistance $R_{L,opt}$. Normally, the efficiency vs. $R_L$ function shows a broad maximum area, indicating a low sensitivity of efficiency on the choice of $R_L$. Therefore, in practice, a system that operates with $R_L$ near or substantially at $R_{L,opt}$ may be considered optimum in terms of efficiency. For a series-tuned IPT system, such as that shown for any of FIGS. 6-10, the optimum load resistance may be expressed as:

$$R_{L,opt} = R_2 \sqrt{1 + \frac{\omega^2 M^2}{R_1 R_2}} \cong \sqrt{\frac{R_2}{R_1}} \omega M \qquad \text{Equation 16}$$
$$\text{for } \frac{\omega^2 M^2}{R_2 R_1} \gg 1$$

where $R_1$ and $R_2$ denote the primary and secondary total loss resistance, respectively, $M=k\sqrt{L_1 L_2}$ the mutual inductance determined by coupling coefficient k, primary and secondary coupler inductances $L_1$ and $L_2$, and $\omega$ the angular (resonant) frequency. Loss resistances $R_1$ and $R_2$ may include losses of both IPT coupler and power conversion.

Thus, adjusting the wireless power transfer system 1000 to the optimum load resistance $R_{L,opt}$ requires knowledge or an estimate of $R_1$ and $R_2$, as well as of the mutual inductance M (e.g., the coupling coefficient k) as determined by the air gap and misalignment of the secondary coupler 1018 relative to the primary coupler 1014. When coupling conditions change, the load resistance $R_L$ may be adjusted to a new $R_{L,opt}$. Thus, in some implementations, estimates of loss resistances $R_1$ and $R_2$ may be used. These estimates may be system specific and may have been determined by the system vendor or supplier, or they may have been determined by some other procedure. The mutual inductance is easier to determine and may be measured, e.g., during a system initialization procedure.

As shown below, operating a resonant IPT system at an optimum load resistance is equivalent to maintaining an optimum primary-to-secondary current ratio $k_{i,opt}$. Assuming validity of the approximate expression for the optimum load resistance of a series-tuned system, the resistance that is reflected into the primary coupler 1014 may be expressed as:

$$R_{ref} = \frac{\omega^2 M^2}{R_{L,opt}} \cong \sqrt{\frac{R_1}{R_2}} \omega M \qquad \text{Equation 17}$$

Assuming system losses are small compared to transferred power, the power equation may be written as:

$$P \cong I_1^2 R_{ref} \cong I_2^2 R_L \qquad \text{Equation 18}$$

It follows for the optimum primary-to-secondary current ratio may be determined as:

$$k_{i,opt} \cong \frac{I_2}{I_1} \cong \sqrt{\frac{R_{ref}}{R_{L,opt}}} \cong \sqrt{\frac{R_1}{R_2}} \qquad \text{Equation 19}$$

As shown, $k_{i,opt}$ is solely determined by the square root of the loss resistance ratio of $R_1$ to $R_2$. Ideally, it is not a function of the mutual inductance M, or of the transferred power P. Conversely, if the system is operated at the current ratio $k_{i,opt}$ then secondary power conversion presents $R_{L,opt}$ at its input, regardless of coupling and power. Equation 19 may also be interpreted as a balance in the loss of power dissipated in the primary subsystem and in the secondary subsystem. If losses are small relative to the transferred power, achieving loss balance is nearly equivalent to achieving maximum efficiency.

Figure 11:
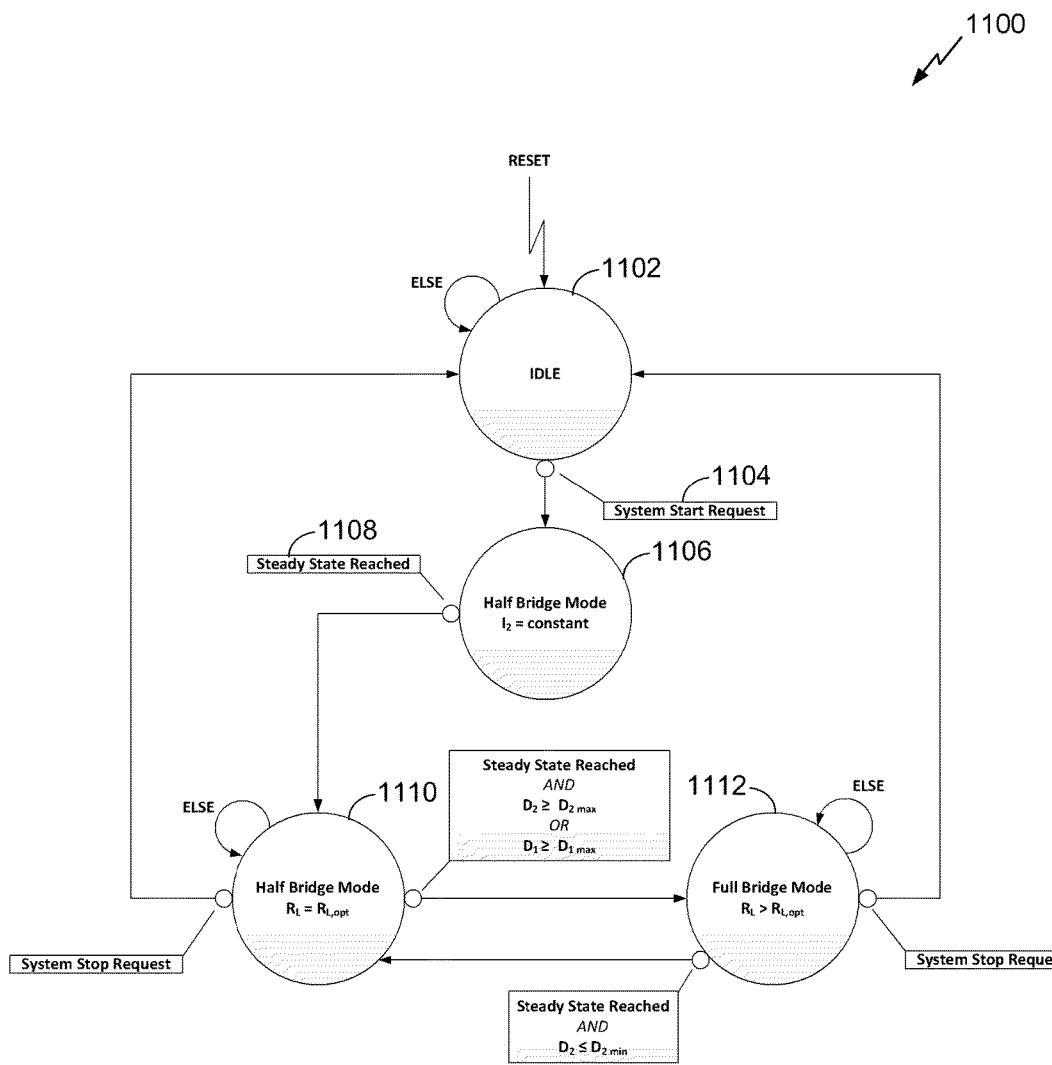
FIG. 11 illustrates a state diagram for operating a wireless power transfer system, in accordance with some implementations.

FIG. 11 illustrates a state diagram 1100 for operating a wireless power transfer system, in accordance with some implementations. As shown in FIG. 11, the state diagram 1100 may begin in an idle state 1102. Upon receiving a start request 1104 the bridge mode and current ratio controller 1054 of FIG. 10 may instruct the secondary PWM generator 1052 to operate the secondary power converter 1016 in a half bridge mode 1106, where the system ramps up the secondary current $I_2$ to a predefined (e.g., constant) value, which may be reached in any operating condition. When a steady state 1108 is reached, the system may adjust the currents $I_2$ and $I_1$ by varying the duty cycles of the $PWM_1$ and $PWM_{2,HB1/HB2}$ (via the primary duty cycle controller 1062 and the secondary duty cycle controller 1048) to meet the target output power $P_{out\_target}$ and a first current ratio $k_i$ that is an optimum current ratio $k_{i,opt}$, which acts to adjust the load resistance $R_L$, presented at the input of the secondary power converter 1016 of FIG. 10, to $R_{L,opt}$ shown at state 1110.

During adjustment of the duty cycles, if the required duty cycle of $PWM_{2,HB1/HB2}$ reaches or exceeds an upper limit $D_{2,max}$ or the required duty cycle of $PWM_1$ reaches or exceeds an upper limit $D_{1,max}$ the bridge mode and current ratio controller 1054 within the secondary subsystem may signal the secondary PWM generator 1052 to transition the secondary power converter 1016 to FB mode at state 1112. Once in the FB mode, the system again adjusts the currents $I_2$ and $I_1$ to meet the target output power $P_{out\_target}$ and a second current ratio $k_i$. This second current ratio $k_i$ may be a non-optimum current ratio, however, being as close as possible to $k_{i,opt}$, which acts to adjust $R_L$ to a non-optimum load resistance that is as close as possible to $R_{L,opt}$. For a series-tuned secondary, as shown in FIG. 10, this non-optimum load resistance is larger than $R_{L,opt}$. For a parallel-tuned secondary, this non-optimum load resistance is smaller than $R_{L,opt}$.

However, in adjusting the duty cycle of $PWM_{2,HB1/HB2}$ in the FB mode, if the duty cycle reaches or drops below a lower limit $D_{2,min}$, the bridge mode and current ratio controller 1054 within the secondary subsystem may signal the secondary PWM generator 1052 to transition the secondary power converter 1016 back to the HB mode, shifting to state 1110. The system may transition back to the idle state 1102 from any state if a "system stop" request is received by the system.

In an alternative implementation and with reference to the wireless power transfer system 1000 of FIG. 10, bridge reconfiguration is performed in the primary power converter 1012 (e.g., inverter) rather than in the secondary power converter 1016 (e.g., rectifier), and the secondary power converter 1016 may be fixed to either a half bridge or a full bridge mode, but actively switching. In such implementations, the secondary controller 1042 adjusts the duty cycle of $PWM_{2,HB1/HB2}$ to meet the target output power $P_{out\_target}$ and to achieve the optimal load resistance $R_{L,opt}$, if the primary power converter 1012 is currently operating in the HB mode. If the primary power converter 1012 is operating in HB mode and the duty cycle of $PWM_{2,HB1/HB2}$ reaches or exceeds the upper limit $D_{2,max}$ or the duty cycle of $PWM_1$ reaches or exceeds $D_{1,max}$, the primary power converter 1012 may transition to the FB mode. Upon this transition to the FB mode, the secondary subsystem maintains the duty cycle $D_2$ at $D_{2,max}$, which acts to maintain or adjust the load resistance $R_L$ at a non-optimal load resistance that is as close as possible to $R_{L,opt}$.

In yet another alternative implementation and with reference to the wireless power transfer system 1000 of FIG. 10, bridge reconfiguration may be performed in the primary power converter 1012 (e.g., inverter) and in the secondary power converter 1016 (e.g., rectifier). In such implementations, the secondary controller 1042 adjusts the duty cycle $D_2$ to meet the target output power $P_{out\_target}$ and to achieve the optimal load resistance $R_{L,opt}$, if the primary power converter 1012 and the secondary power converter 1016 are both currently operating in the HB mode. If the primary power converter 1012 and the secondary power converter 1016 are both currently operating in the HB mode and the duty cycle $D_2$ reaches or exceeds the upper limit $D_{2,max}$ or the duty cycle $D_1$ reaches or exceeds the upper limit $D_{1,max}$ the primary power converter 1012 and the secondary power converter 1016 may both transition to the FB mode. The secondary power converter 1016 being in the FB mode may present the load resistance $R_L$ at a non-optimal load resistance that is as close as possible to $R_{L,out}$.

Above control strategies may be considered optimum with respect to 1) primary and secondary side pulse width modulation (PWM) duty cycle limitations (e.g., switching losses), 2) dealing with worst case and best case coupling conditions, and 3) avoiding resonance bifurcation (e.g., splitting of the resonance response into two peaks), which may cause beat frequency issues e.g., as perceived by a ringing of the power transfer signal with a beat frequency equal to the difference in frequency between these two peaks. These distinct resonances may be excited concurrently e.g. in a controlled system, where adjustments of some parameters are performed in steps.

Figure 12:
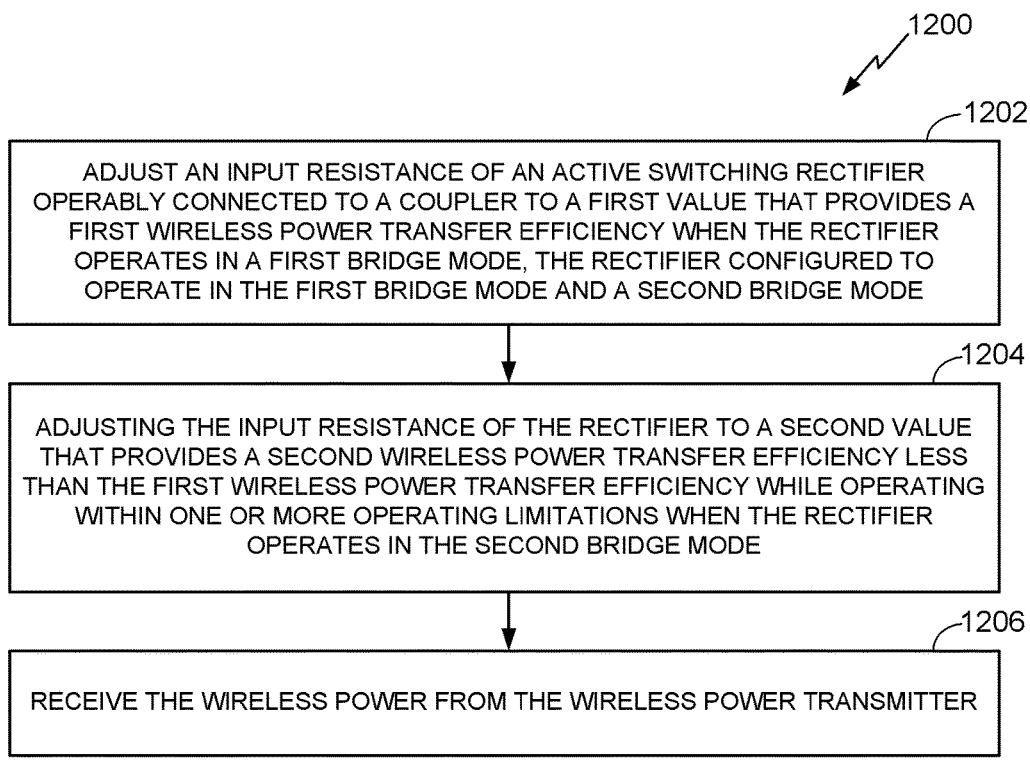
FIG. 12 is a flowchart of a method for wirelessly receiving power from a wireless power transmitter, in accordance with some implementations.

FIG. 12 is a flowchart 1200 of a method for wirelessly receiving power from a wireless power transmitter, in accordance with some implementations. The flowchart 1200 includes operation block 1202, which includes adjusting an input resistance of an active switching rectifier operably connected to a coupler to a first value that provides a first wireless power transfer efficiency when the rectifier operates in a first bridge mode, the rectifier configured to operate in the first bridge mode and a second bridge mode. The method further includes operation block 1204, which includes adjusting the input resistance of the rectifier to a second value that provides a second wireless power transfer efficiency less than the first wireless power transfer efficiency while operating within one or more operating limitations when the rectifier operates in the second bridge mode. The method further includes operation block 1206, which includes receiving the wireless power from the wireless power transmitter.

Figure 13:
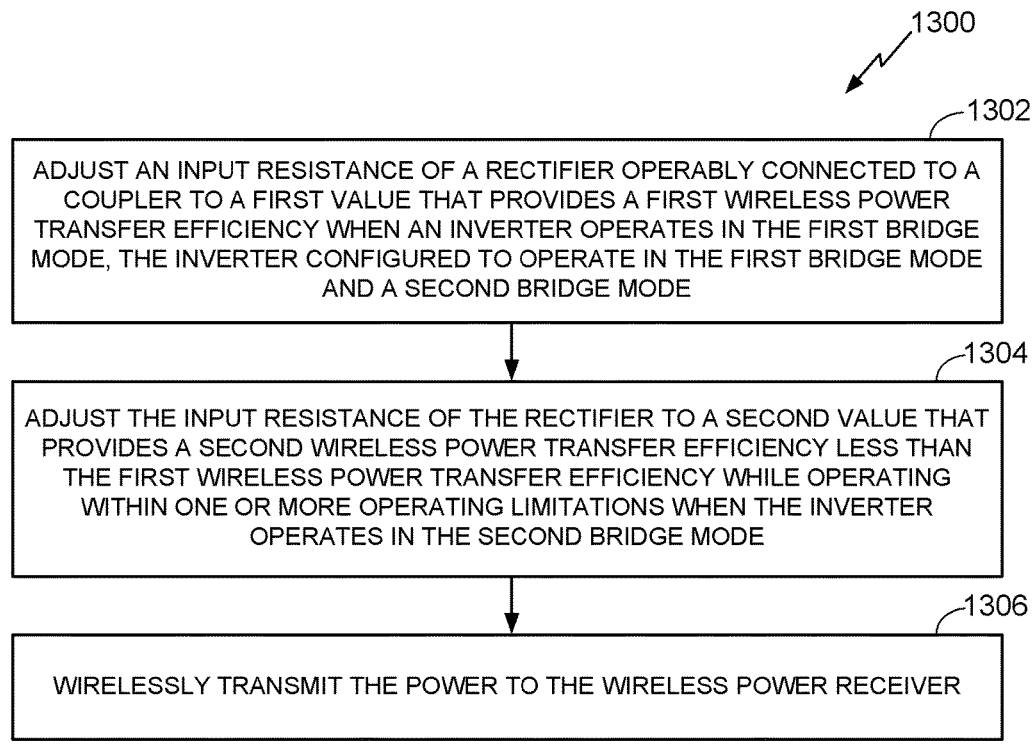
FIG. 13 is a flowchart of a method for wirelessly transmitting power to a wireless power receiver, in accordance with some implementations.

FIG. 13 is a flowchart 1300 of a method for wirelessly transmitting power to a wireless power receiver, in accordance with some implementations. The flowchart 1300 includes operation block 1302, which includes adjusting an input resistance of a rectifier operably connected to a coupler to a first value that provides a first wireless power transfer efficiency when an inverter operates in the first bridge mode, the inverter configured to operate in the first bridge mode and a second bridge mode. The method further includes operation block 1304, which includes adjusting the input resistance of the rectifier to a second value that provides a second wireless power transfer efficiency less than the first wireless power transfer efficiency while operating within one or more operating limitations when the inverter operates in the second bridge mode. The method further includes operation block 1306, which includes wirelessly transmit the power to the wireless power receiver. In some implementations, the first bridge mode is a half bridge mode and the second value of the input resistance of the inverter is greater than the first value if the coupler is essentially series tuned.

The first bridge mode may be a full bridge mode and the second value of the input resistance of the inverter is less than the first value if the coupler is essentially parallel tuned. The method may further comprise adjusting a switching duty cycle of the inverter based on a current output by the inverter and a predetermined ratio between the current output by the inverter and a current in the wireless power receiver. The method may further comprise selecting one of the first bridge mode and the second bridge mode of the inverter based on a comparison between a switching duty cycle of the inverter and one or both of an associated maximum allowable duty cycle and an associated minimum allowable duty cycle. The method may further comprise selecting one of the first bridge mode and the second bridge mode of the inverter based on a comparison between a switching duty cycle of an inverter in the wireless power receiver and one or both of an associated maximum allowable duty cycle and an associated minimum allowable duty cycle. The first wireless power transfer efficiency is a substantially maximum attainable wireless power transfer efficiency when the input resistance of the rectifier has the first value and the inverter is operating in the first bridge mode. The method may further comprise adjusting a ratio between a current circulating in the apparatus and a current circulating in the wireless power receiver in order to adjust the input resistance of the rectifier.

In view of the discussion in connection with at least FIG. 13, several additional implementations for wirelessly transmitting power to a wireless power receiver are contemplated. For example, some implementations include an apparatus for wirelessly transmitting power to a wireless power receiver. The apparatus comprises an inverter operably connected to a coupler and configured to operate in a first bridge mode and a second bridge mode. The apparatus further comprises a controller configured to adjust an input resistance of the rectifier to a first value that provides a first wireless power transfer efficiency when the inverter operates in the first bridge mode, and adjust the input resistance of the rectifier to a second value that provides a second wireless power transfer efficiency less than the first wireless power transfer efficiency while operating within one or more operating limitations when the inverter operates in the second bridge mode. The first bridge mode is a half bridge mode and the second value of the input resistance of the inverter is greater than the first value if the coupler is essentially series tuned. The first bridge mode is a full bridge mode and the second value of the input resistance of the inverter is less than the first value if the coupler is essentially parallel tuned. The controller is configured to adjust a switching duty cycle of the inverter based on a current in the apparatus and a predetermined ratio between the current in the apparatus and a current in the wireless power receiver. The controller is configured to select one of the first bridge mode and the second bridge mode of the inverter based on a comparison between a switching duty cycle of the inverter and one or both of an associated maximum allowable duty cycle and an associated minimum allowable duty cycle. The controller is configured to select one of the first bridge mode and the second bridge mode of the inverter based on a comparison between a switching duty cycle of an inverter in the wireless power receiver and one or both of an associated maximum allowable duty cycle and an associated minimum allowable duty cycle. The first wireless power transfer efficiency is a substantially maximum attainable wireless power transfer efficiency when the input resistance of the inverter has the first value and the inverter is operating in the first bridge mode. The controller is configured to adjust a ratio between a current circulating in the apparatus and a current circulating in the wireless power receiver in order to adjust the input resistance of the inverter.

Some other implementations comprise a non-transitory computer-readable medium comprising code that, when executed, causes a wireless power transmitter to adjust an input resistance of a rectifier operably connected to a coupler to a first value that provides a first wireless power transfer efficiency when the inverter operates in the first bridge mode, the inverter configured to operate in the first bridge mode and a second bridge mode. The code, when executed, further causes the wireless power transmitter to adjust the input resistance of the rectifier to a second value that provides a second wireless power transfer efficiency less than the first wireless power transfer efficiency while operating within one or more operating limitations when the inverter operates in the second bridge mode. The code, when executed, further causes the wireless power transmitter to wirelessly transmit the power to the wireless power receiver. The first bridge mode is a half bridge mode and the second value of the input resistance of the inverter is greater than the first value if the coupler is essentially series tuned. The first bridge mode is a full bridge mode and the second value of the input resistance of the rectifier is less than the first value if the coupler is essentially parallel tuned. The code, when executed, further causes the wireless power transmitter to adjust a switching duty cycle of the inverter based on a current output by the inverter and a predetermined ratio between the current output by the inverter and a current in the wireless power receiver. The code, when executed, further causes the wireless power transmitter to select one of the first bridge mode and the second bridge mode of the inverter based on a comparison between a switching duty cycle of the inverter and one or both of an associated maximum allowable duty cycle and an associated minimum allowable duty cycle. The code, when executed, further causes the wireless power transmitter to select one of the first bridge mode and the second bridge mode of the inverter based on a comparison between a switching duty cycle of an inverter in the wireless power receiver and one or both of an associated maximum allowable duty cycle and an associated minimum allowable duty cycle. The first wireless power transfer efficiency is a substantially maximum attainable wireless power transfer efficiency when the input resistance of the rectifier has the first value and the rectifier is operating in the first bridge mode. The code, when executed, further causes the wireless power transmitter to adjust a ratio between a current circulating in the wireless power transmitter and a current circulating in the wireless power receiver in order to adjust the input resistance of the inverter.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the some implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the some implementations.

The various illustrative logical blocks, modules, and circuits described in connection with the some implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the some implementations disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In one or more some implementations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed some implementations is provided to enable any person skilled in the art to make or use those implementations. Various modifications to these some implementations will be readily apparent to those skilled in the art, and the generic principles defined herein may be applied to other implementations without departing from the spirit or scope of the present application. Thus, the present application is not intended to be limited to the some implementations shown herein but is to be accorded the widest scope consistent with the principles and novel features disclosed herein.

What is claimed is:

1. An apparatus for wirelessly receiving power from a wireless power transmitter, the apparatus comprising:
    an active switching rectifier operably connected to a coupler and configured to operate in a first bridge mode and a second bridge mode; and
    a controller configured to:
        adjust an input resistance of the rectifier to a first value that provides a first wireless power transfer efficiency in response to configuring the rectifier in the first bridge mode, and
        adjust the input resistance of the rectifier to a second value that provides a second wireless power transfer efficiency less than the first wireless power transfer efficiency while operating within one or more operating limitations in response to configuring the rectifier in the second bridge mode.

2. The apparatus of claim 1, wherein the first bridge mode is a half bridge mode and the second value of the input resistance of the rectifier is greater than the first value if the coupler is series tuned.

3. The apparatus of claim 1, wherein the first bridge mode is a full bridge mode and the second value of the input resistance of the rectifier is less than the first value if the coupler is parallel tuned.

4. The apparatus of claim 1, wherein the controller is configured to adjust a switching duty cycle of the rectifier based on a current in the wireless power transmitter.

5. The apparatus of claim 1, wherein the controller is configured to select one of the first bridge mode and the second bridge mode of the rectifier based on a comparison between a switching duty cycle of the rectifier and one or both of an associated maximum allowable duty cycle and an associated minimum allowable duty cycle.

6. The apparatus of claim 1, wherein the controller is configured to select one of the first bridge mode and the second bridge mode of the rectifier based on a comparison between a switching duty cycle of a rectifier in the wireless power transmitter and one or both of an associated maximum allowable duty cycle and an associated minimum allowable duty cycle.

7. The apparatus of claim 1, wherein the first wireless power transfer efficiency is a substantially maximum attainable wireless power transfer efficiency when the input resistance of the rectifier has the first value and the rectifier is operating in the first bridge mode.

8. The apparatus of claim 1, wherein the controller is configured to adjust a ratio between a current circulating in the apparatus and a current circulating in the wireless power transmitter in order to adjust the input resistance of the rectifier.

9. A method for wirelessly receiving power from a wireless power transmitter, the method comprising:
    adjusting an input resistance of an active switching rectifier operably connected to a coupler to a first value that provides a first wireless power transfer efficiency in response to configuring the rectifier in a first bridge mode,
    adjusting the input resistance of the rectifier to a second value that provides a second wireless power transfer efficiency less than the first wireless power transfer efficiency while operating within one or more operating limitations in response to configuring the rectifier in a second bridge mode, and
    receiving the wireless power from the wireless power transmitter.

10. The method of claim 9, wherein the first bridge mode is a half bridge mode and the second value of the input resistance of the rectifier is greater than the first value if the coupler is essentially series tuned.

11. The method of claim 9, wherein the first bridge mode is a full bridge mode and the second value of the input resistance of the rectifier is less than the first value if the coupler is essentially parallel tuned.

12. The method of claim 9, further comprising adjusting a switching duty cycle of the rectifier based on a current in the wireless power transmitter.

13. The method of claim 9, further comprising selecting one of the first bridge mode and the second bridge mode of the rectifier based on a comparison between a switching duty cycle of the rectifier and one or both of an associated maximum allowable duty cycle and an associated minimum allowable duty cycle.

14. The method of claim 9, further comprising selecting one of the first bridge mode and the second bridge mode of the rectifier based on a comparison between a switching duty cycle of a rectifier in the wireless power transmitter and one or both of an associated maximum allowable duty cycle and an associated minimum allowable duty cycle.

15. The method of claim 9, wherein the first wireless power transfer efficiency is a substantially maximum attainable wireless power transfer efficiency when the input resistance of the rectifier has the first value and the rectifier is operating in the first bridge mode.

16. The method of claim 9, comprising adjusting a ratio between a current circulating in the coupler and a current circulating in the wireless power transmitter in order to adjust the input resistance of the rectifier.

17. A non-transitory computer-readable medium comprising code that, when executed, causes an apparatus configured to wirelessly receive power from a wireless power transmitter to:
   adjust an input resistance of an active switching rectifier operably connected to a coupler to a first value that provides a first wireless power transfer efficiency in response to configuring the rectifier in a first bridge mode,
   adjust the input resistance of the rectifier to a second value that provides a second wireless power transfer efficiency less than the first wireless power transfer efficiency while operating within one or more operating limitations in response to configuring the rectifier in a second bridge mode, and
   receive the wireless power from the wireless power transmitter.

18. The medium of claim 17, wherein the first bridge mode is a half bridge mode and the second value of the input resistance of the rectifier is greater than the first value if the coupler is essentially series tuned.

19. The medium of claim 17, wherein the first bridge mode is a full bridge mode and the second value of the input resistance of the rectifier is less than the first value if the coupler is essentially parallel tuned.

20. The medium of claim 17, wherein the code, when executed, further causes the apparatus to adjust a switching duty cycle of the rectifier based on a current in the wireless power transmitter.

21. The medium of claim 17, wherein the code, when executed, further causes the apparatus to select one of the first bridge mode and the second bridge mode of the rectifier based on a comparison between a switching duty cycle of the rectifier and one or both of an associated maximum allowable duty cycle and an associated minimum allowable duty cycle.

22. The medium of claim 17, wherein the code, when executed, further causes the apparatus to select one of the first bridge mode and the second bridge mode of the rectifier based on a comparison between a switching duty cycle of a rectifier in the wireless power transmitter and one or both of an associated maximum allowable duty cycle and an associated minimum allowable duty cycle.

23. The medium of claim 17, wherein the first wireless power transfer efficiency is a substantially maximum attainable wireless power transfer efficiency when the input resistance of the rectifier has the first value and the rectifier is operating in the first bridge mode.

24. The medium of claim 17, wherein the code, when executed, further causes the apparatus to adjust a ratio between a current circulating in the apparatus and a current circulating in the wireless power transmitter in order to adjust the input resistance of the rectifier.

25. An apparatus for wirelessly receiving power from a wireless power transmitter, the apparatus comprising:
   means for rectifying an input from a coupler configured to operate in a first bridge mode and a second bridge mode;
   means for adjusting an input resistance of the means for rectifying to a first value that provides a first wireless power transfer efficiency in response to configuring the means for rectifying in the first bridge mode, and
   means for adjusting the input resistance of the means for rectifying to a second value that provides a second wireless power transfer efficiency less than the first wireless power transfer efficiency while operating within one or more operating limitations in response to configuring the means for rectifying in the second bridge mode.

26. The apparatus of claim 25, wherein the first bridge mode is a half bridge mode and the second value of the input resistance of the means for rectifying is greater than the first value if the coupler is essentially series tuned.

27. The apparatus of claim 25, wherein the first bridge mode is a full bridge mode and the second value of the input resistance of the means for rectifying is less than the first value if the coupler is essentially parallel tuned.

28. The apparatus of claim 25, further comprising means for adjusting a switching duty cycle of the means for rectifying based on a current in the wireless power transmitter.

29. The apparatus of claim 25, further comprising means for selecting one of the first bridge mode and the second bridge mode of the means for rectifying based on a comparison between a switching duty cycle of the means for rectifying and one or both of an associated maximum allowable duty cycle and an associated minimum allowable duty cycle.

30. The apparatus of claim 25, further comprising means for selecting one of the first bridge mode and the second bridge mode of the means for rectifying based on a comparison between a switching duty cycle of a means for rectifying in the wireless power transmitter and one or both of an associated maximum allowable duty cycle and an associated minimum allowable duty cycle.

* * * * *